(12) United States Patent
Kubo

(10) Patent No.: US 12,081,855 B2
(45) Date of Patent: Sep. 3, 2024

(54) LIGHT MODULATING ELEMENT AND OPTICAL APPARATUS, IMAGING APPARATUS AND LENS UNIT USING THE SAME

(71) Applicant: CANON KABUSHIKI KAISHA, Tokyo (JP)

(72) Inventor: Wataru Kubo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 160 days.

(21) Appl. No.: 17/854,340

(22) Filed: Jun. 30, 2022

(65) Prior Publication Data

US 2022/0345599 A1 Oct. 27, 2022

Related U.S. Application Data

(63) Continuation of application No. PCT/JP2021/003827, filed on Feb. 3, 2021.

(30) Foreign Application Priority Data

Feb. 6, 2020 (JP) .................................. 2020-018447
Oct. 29, 2020 (JP) .................................. 2020-181041

(51) Int. Cl.
*H04N 23/55* (2023.01)
*G02F 1/155* (2006.01)
*G02F 1/157* (2006.01)

(52) U.S. Cl.
CPC ............. *H04N 23/55* (2023.01); *G02F 1/155* (2013.01); *G02F 1/157* (2013.01)

(58) Field of Classification Search
CPC ........ H04N 23/55; H04N 25/00; G02F 1/155; G02F 1/157; G02F 2201/08; G02B 5/22; G03B 11/00
See application file for complete search history.

(56) References Cited

U.S. PATENT DOCUMENTS 5,764,401 A * 6/1998 Udaka .................... G02F 1/1506
  359/272
6,094,292 A * 7/2000 Goldner ................... E06B 9/24
  427/523

(Continued)

FOREIGN PATENT DOCUMENTS

JP  2009-175225 A  8/2009
JP  2017-021327 A  1/2017

(Continued)

OTHER PUBLICATIONS

Enrique Botana et al., "Inclusion of Cavitands and Calix[4]arenes into a Metallobridged para-(1H-Imidazo[4,5-f][3,8]phenanthrolin-2-yl)-Expanded Calix[4]arene," 46 Angew. Chem. Int. Ed. 198-201 (2007).

(Continued)

*Primary Examiner* — Michael Lee
(74) *Attorney, Agent, or Firm* — Venable LLP

(57) ABSTRACT

There is provided a light modulating element including a plurality of compounds whose light absorption characteristics change with external simulation. The plurality of compounds are compounds having different absorption wavelengths. The light modulating element has a variable transmittance $VT(\lambda)$ obtained by combining light absorption characteristics of the plurality of compounds. $NWD_{Max} < NWD_{MaxFP}$ is satisfied.

27 Claims, 13 Drawing Sheets

(56) References Cited

U.S. PATENT DOCUMENTS

| | | | |
|---|---|---|---|
| 6,261,478 B1* | 7/2001 | Udaka | G02F 1/1506 359/266 |
| 9,766,527 B2 | 9/2017 | Kubo et al. | |
| 9,869,919 B2 | 1/2018 | Kubo et al. | |
| 10,151,958 B2 | 12/2018 | Yamamoto et al. | |
| 10,444,588 B2 | 10/2019 | Yamada et al. | |
| 10,684,526 B2 | 6/2020 | Yamamoto et al. | |
| 2015/0212382 A1* | 7/2015 | Miyazaki | G02F 1/155 359/275 |
| 2017/0336545 A1* | 11/2017 | Blair | A61M 21/02 |
| 2018/0052375 A1* | 2/2018 | Yamada | G02B 5/205 |
| 2018/0136530 A1 | 5/2018 | Yamamoto et al. | |
| 2019/0229137 A1* | 7/2019 | Kubo | G02B 26/023 |
| 2020/0074959 A1* | 3/2020 | Bhat | G09G 5/02 |
| 2021/0011351 A1* | 1/2021 | Kubo | G02F 1/1516 |
| 2021/0294008 A1* | 9/2021 | Kubo | G02B 5/205 |
| 2022/0197098 A1* | 6/2022 | Kubo | G02F 1/1514 |

FOREIGN PATENT DOCUMENTS

| | | |
|---|---|---|
| JP | 2018-084805 A | 5/2018 |
| JP | 2020-016836 A | 1/2020 |
| WO | 99/04316 A2 | 1/1999 |
| WO | 2020/121845 A1 | 6/2020 |
| WO | 2021/157594 A1 | 8/2021 |

OTHER PUBLICATIONS

International Search Report in International Application No. PCT/JP2021/003827 (May 2021).

International Preliminary Report on Patentability in International Application No. PCT/JP2021/003827 (Jul. 2022).

* cited by examiner

LIGHT MODULATING ELEMENT AND OPTICAL APPARATUS, IMAGING APPARATUS AND LENS UNIT USING THE SAME

CROSS-REFERENCE TO RELATED APPLICATIONS

This application is a Continuation of International Patent Application No. PCT/JP2021/003827, filed Feb. 3, 2021, which claims the benefit of Japanese Patent Application No. 2020-018447, filed Feb. 6, 2020 and Japanese Patent Application No. 2020-181041, filed Oct. 29, 2020, all of which are hereby incorporated by reference herein in their entirety.

BACKGROUND OF THE INVENTION

Field of the Invention

The present disclosure relates to a light modulating element and an optical apparatus, an imaging apparatus and a lens unit using the same.

Description of the Related Art

An ND (neutral density) filter, which is one of light modulating elements, is a filter that reduces the amount of light while suppressing the influence on color and is widely used for capturing still images and moving images. In recent years, variable ND filters in which the degree of light attenuation of ND filters can be electrically changed have been put to practical use, which enables an image expression that has not been realized so far. Such a variable ND filter contains a plurality of compounds whose light absorption characteristics change with an external stimulation (in particular, electrically) and a combination of light absorption of the plurality of compounds achieves control of the degree of light attenuation while suppressing the influence on color.

One important feature of the ND filter is that the influence of a light source on color reproducibility is small (the light source influence on color reproducibility is small). An ideal ND filter has a constant transmittance (the highest wavelength flatness) regardless of the wavelength of transmitted light, and such an ND filter can reduce the influence of the light source on color to zero. Therefore, in the conventional ND filter, the light source influence on the color reproducibility has been suppressed by increasing the wavelength flatness. Japanese Patent Application Laid-Open No. 2009-175225 discloses an ND filter that uses a multilayer film having high wavelength flatness and does not change the degree of light attenuation (a degree of light attenuation is fixed). The ND filter having such a high wavelength flatness can reduce the light source influence on color reproducibility.

In a variable ND filter containing a plurality of compounds whose light absorption characteristics change with external stimulation, some variable ND filters exhibit ND characteristics due to a combination of absorption spectra of the plurality of compounds. In this case, since there is a limit in controlling the absorption wavelength of a plurality of compounds, it is difficult to realize a spectrum with high flatness as in an ND filter in which the degree of light attenuation does not change (a conventional ND filter with fixed degree of light attenuation). The inventor of the present disclosure has attempted to improve the wavelength flatness, but it has been difficult to realize a variable ND filter in which the light source influence of the light source on color reproducibility is highly suppressed.

SUMMARY OF THE INVENTION

It is an object of the present disclosure to provide a light modulating element such as a variable ND filter in which substantial light source influence on color reproducibility is highly suppressed and apparatuses using the light modulating element.

According to the first aspect of the present disclosure, provided is an optical apparatus including a photodetector and a plurality of compounds whose light absorption characteristics change with external simulation. The plurality of compounds are compounds having different absorption wavelengths. The light modulating element has a variable transmittance $VT(\lambda)$ obtained by combining light absorption characteristics of the plurality of compounds. $NWD_{Max} < NWD_{MaxFP}$ is satisfied. Where $NWD_{Max}$ is a maximum value of ratios between a reference light source and a contrast light source and ratios of a signal intensity ratio of a transmitted light for each detection light wavelength region incident on the photodetector between a transmission state and a light attenuation state of the light modulating element (the reference light source/the contrast light source or the contrast light source/the reference light source), and $NWD_{MaxFP}$ is $NWD_{Max}$ in a concentration ratio of the plurality of compounds in which the wavelength flatness TF of the $VT(\lambda)$ in the detection light wavelength region is a minimum value TFFP.

According to the second aspect of the present disclosure, provided is an optical apparatus including a light modulating element and a photodetector that receives a light passing through the light modulating element and has a plurality of detection light wavelength regions directed to the light modulating element. The photodetector is an imaging element. The light modulating element is the light modulating element according to above-described disclosure.

According to the third aspect of the present disclosure, provided is an imaging apparatus including an optical system including a plurality of lenses, an imaging element that receives a light passing through the optical system and an optical filter arranged between the optical system and the imaging element. The optical filter includes the light modulating element according to above-described disclosure.

According to the fourth aspect of the present disclosure, provided is a lens unit including the light modulating element according to above-described disclosure and an imaging optical system including a plurality of lenses. The lens unit is connectable to an optical apparatus including a photodetector. The lens unit is connected to an optical apparatus having a photodetector so that light passing through the lens unit is incident on the photodetector of the optical apparatus. The photodetector is a photodetector having a plurality of detection light wavelength regions directed to the light modulating element.

Further features of the present disclosure will become apparent from the following description of exemplary embodiments with reference to the attached drawings.

DESCRIPTION OF THE EMBODIMENTS

A light modulating element according to the present disclosure includes a plurality of compounds whose light absorption characteristics change by external stimulation and exhibits variable light absorption in the visible light region by superposition of a plurality of absorption spectra of the compounds. When the transmission spectrum of the light modulating element is taken with the horizontal axis representing the wavelength and the vertical axis representing the transmittance, the absorption spectrum can be made flat depending on the concentration ratio of the plurality of compounds and the like. The light modulating element according to the present disclosure is an element that focuses on suppressing a substantial light source influence on color reproducibility rather than flatness of an absorption spectrum, and is evaluated using a parameter $NWD_{Max}$.

Hereinafter, an embodiment of the present disclosure will be described with reference to the drawings. Note that the present disclosure is not limited to the following embodiment, and those in which changes, improvements and the like are appropriately added to the following embodiment based on ordinary knowledge of those skilled in the art without departing from the spirit of the present disclosure are also included in the scope of the present disclosure.

[Optical Apparatus including Light Modulating Element]

Figure 1:
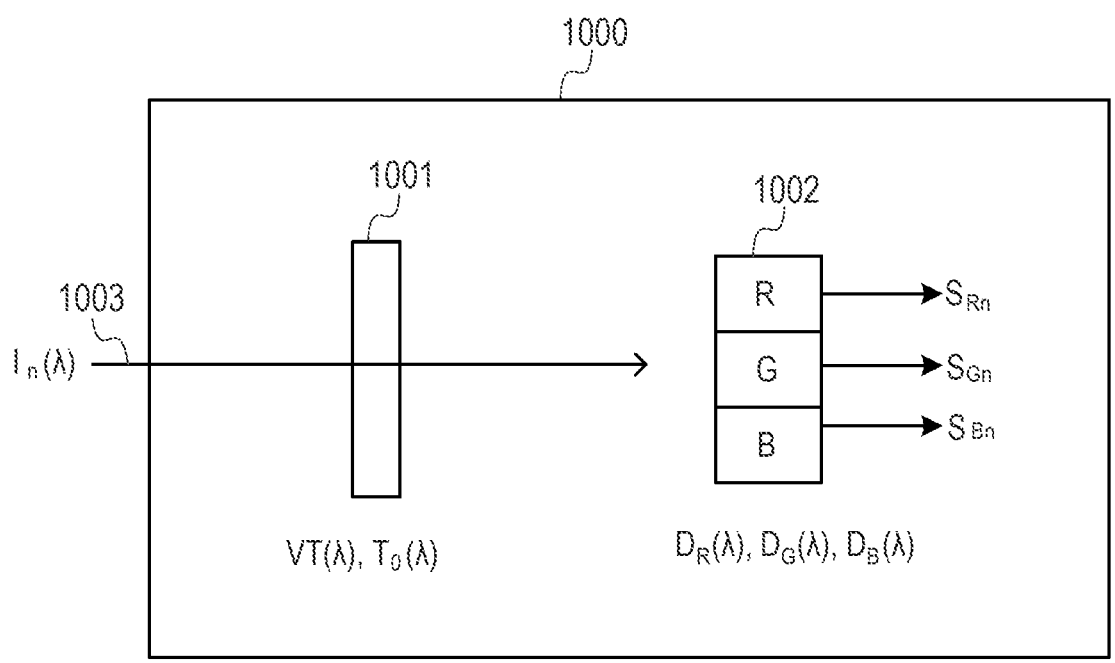
FIG. 1 is a diagram schematically illustrating an example of an optical apparatus including a light modulating element according to the present disclosure.

FIG. 1 is a schematic diagram illustrating an example of an optical apparatus including a light modulating element according to the present disclosure.

In FIG. 1, an optical apparatus 1000 includes a light modulating element 1001 such as a variable ND filter, and a photodetector 1002 such as an imaging element having a plurality of detection light wavelength regions such as R (red), G (green), and B (blue). When a photodetector is provided separately from the optical apparatus 1000, the optical apparatus 1000 does not necessarily include the photodetector 1002. Examples of the optical apparatus according to the present embodiment include a camera system with a variable ND filter (including cameras and lenses), transmittance-variable windows, transmittance-variable eyeglasses, and reflectance-variable mirrors.

[Photodetector]

The light modulating element according to the present disclosure is applied to a particular photodetector. In other words, the light modulating element according to the present disclosure is designed so as to exhibit its function when combined with a particular photodetector. Examples of the combination include a combination of a camera system and an image sensor such as a CMOS sensor, a combination of a transmittance-variable window and a human eye, a combination of a transmittance-variable eyeglasses and a human eye, and a combination of a reflectance-variable mirror and a human eye. The photodetector is a photodetector having a plurality of detection light wavelength regions.

Specifically, for example, the plurality of detection wavelength regions are R, G, and B in CMOS sensor for imaging sensor, or the x-bar, y-bar, and z-bar of the CIE color matching functions in a human eye. Examples of the CIE color matching function include CIE (1931), CIE (1964), and CIE (2006), and functions of a 2 degree field of view and a 10 degrees field of view can be selected. Any value may be used for the calculation of RRGAC, but particularly, the 2 degree field of view of CIE (1931) is preferably used.

The light modulating element according to the present disclosure is also used as a component of an optical filter of an imaging apparatus including an optical system including a plurality of lens systems, an optical filter, and an imaging element that receives light passing through the optical filter. Further, the light modulating element according to the present disclosure can constitute a lens unit when combined with an imaging optical system having a plurality of lenses. The lens unit can be connected to the optical apparatus including the photodetector, and when connected to the optical apparatus, the lens unit is arranged so that the transmitted light transmitted through the lens unit enters the photodetector. The photodetector may have a plurality of detection light wavelength regions and may be an imaging element.

[Compounds Whose Light Absorption Characteristics Change with External Stimulation]

The light modulating element according to the present disclosure absorbs light by combining a plurality of compounds whose light absorption characteristics change with external stimulation. Examples of such external stimulation include electrical stimulation, thermal stimulation, light stimulation, pH stimulation, and the like. Examples of compounds whose light absorption characteristics change with external stimulation include electrochromic (EC) compounds, liquid crystal compounds (including guest-host liquid crystals), thermochromic compounds, photochromic compounds, and pH-responsive compounds. Among them, compounds whose light absorption characteristics change electrically are preferably used from the viewpoints of stability, ease of control from outside control, and response speed. Among the compounds whose light absorption characteristics change electrically, electrochromic compounds (EC compound) and liquid crystal compounds are preferably used. In particular, a light control element using EC compounds can be preferably used because it can achieve both the light transmission state with a high transmittance and the light attenuation state with a low transmittance.

In order to produce a light modulating element containing compounds whose light absorption characteristic change with external stimulation, it is not easy to achieve high color reproducibility only light absorption characteristics changes of a single compound, and it is preferable to use light absorption characteristics changes of a plurality of compounds. In order to effectively use the light absorption characteristics changes of a plurality of compounds, it is effective to improve color reproducibility by selecting compounds having different light absorption wavelengths as the plurality of compounds and combining the strong absorption and the weak absorption.

The light modulating element according to the present disclosure suppresses a substantial light source influence on the color reproducibility of the variable ND filter by absorbing light by combining a plurality of compounds whose light absorption characteristics change with external stimulation. The reason why a plurality of compounds are used is that, if a single compound is used, the shape of spectrum of the variable ND filter is uniquely determined, and thus the color reproducibility equal to or higher than the color reproducibility of the spectrum of the compound is not desired, and the substantial light source influence on the color reproducibility cannot be suppressed.

The number of compounds to be combined is preferably three or more. The reason is described below.

1. When a variable transmittance spectrum is formed with a combination of compounds having different variable absorption spectra, the more kinds of compounds are used, the more detailed complementation of the absorption wavelength becomes possible. As a result, higher color reproducibility and suppression of the substantial light source influence on color reproducibility become possible. More specifically, it can be described as follows. Considering the concentration ratio, when there are two kinds of compounds, if the concentration ratio of one compound is determined, there is no degree of freedom in the other concentration ratio. In the case where there are three or more kinds of compounds, even if the concentration ratio of one kind of compound is determined, there is a degree of freedom in the concentration ratio of the other two kinds of compounds, and it is possible to complement the absorption wavelength in more detail.

2. A spectroscope to which the ND filter is applied has three or more types of detection wavelength regions, as represented by human eyes and RGB sensors. Therefore, when the plurality of compounds are three or more kinds of compounds, the degree of light absorption corresponding to each detection wavelength region can be made relatively high with respect to other compounds, and the effect of optimization by $NWD_{Max}$ can be dramatically increased. The specific number of compounds is preferably four or more, more preferably six or more.

From the above point of view, it is preferable that at least one compound selected from the plurality of compounds has a peak of the variable absorption spectrum in each of the plurality of detection light wavelength regions of the photodetector. Thus, the setting of the light absorption corresponding to the detection light wavelength region of the photodetector can be performed with a higher degree of freedom than other compounds. In this case, each one of the plurality of detection light wavelength regions of the photodetector is the wavelength region of the detection wavelength region that is the largest in the normalized sensitivity spectrum of the photodetector. For example, in FIG. 2B, the detection light regions of the plurality of detection light wavelength regions (x-bar, y-bar, and z-bar) are x-bar: 580 nm to 680 nm, y-bar: 500 nm to 580 nm, and z-bar: 425 nm to 500 nm. At least one of the compounds selected from the plurality of compounds preferably has a peak in the variable absorption spectrum in each of these regions.

[Principle of Improvement of Color Reproducibility]

In conventional light modulating elements, the light source influence on color reproducibility has been suppressed by increasing the wavelength flatness. In the light modulating element according to the present disclosure, the substantial light source influence on color reproducibility is suppressed by giving a higher priority to reducing the ratio between a reference light source and a contrast light source in a detection signal ratio change in each of the plurality of detection light wavelength regions of the photodetector rather than improving the wavelength flatness. The principle of improving color reproducibility in the light modulating element according to the present disclosure will be described in detail below.

The amount of light entering the imaging element such as the photodetector or the human eye through the light modulating element is proportional to the transmittance of the light modulating element. Therefore, when color reproducibility is discussed, transmittance normalized by the amount of light is used. If the spectrum of the normalized transmittance does not change, the light source influence on the color reproducibility can be removed by correction. However, the light modulating element according to the present disclosure is a light absorption element, and a plurality of compounds are combined to form an absorbance (absorption) spectrum having a specific shape. In this case, the shape of the absorbance spectrum is basically (ideally) constant regardless of the concentration (In other words, the normalized absorbance spectrum essentially does not change). On the other hand, since the relationship between the absorbance Abs and the transmittance T is $T=10^{-Abs}$, even if the shape of the absorbance spectrum is constant, the normalized transmittance spectrum is not constant, and the deviation from the average value increases as the absorbance increases. As a result, it is difficult to remove the light source influence on color reproducibility by correction.

Therefore, in the present disclosure, the light source influence on color reproducibility is suppressed mainly in relation to the photodetector and the light source. Specifically, in the relationship between the sensitivity of the photodetector and the intensity of the light source, deviation from the average value of the normalized transmittance in the wavelength region where the signal intensity is high is suppressed. For example, a photodetector used in an imaging element typically has a wavelength sensitivity characteristic as described in [Photodetector] above, and a main light source has a somewhat continuous intensity spectrum as described in the section of [Light Source] (described below). Thus, the sensitivity of the detector and the intensity of the light source respectively have characteristic wavelength dependence. In a wavelength region where the signal intensity proportional to the product of the sensitivity and the intensity is high, when the transmittance of the light modulating element greatly deviates from that in other wavelength regions, the influence on the case where the light source changes is large. Conversely, in the wavelength region where the signal intensity is low, even if the deviation of the transmittance of the light modulating element is large, the influence is comparatively small. The light modulating element according to the present disclosure suppress the substantial light source influence on color reproducibility by using this concept to suppress a deviation from an average value of normalized transmittance in a wavelength region having a greater influence.

Here, the expression "substantial" will be described. For example, any light source, in an extreme example, a light source having a uniform wavelength such as a laser beam at all wavelengths, and when the influence of the light source influence on the light source is to be suppressed, the wavelength flatness is improved. However, light mainly used in an environment in which a light modulating element is used is often natural light or light simulating natural light, and has a somewhat continuous spectrum with a wide wavelength distribution. If a light source used in an environment in which such a light modulating element is used can be handled, a substantial light source influence can be suppressed.

[Variable Transmittance VT(λ)]

A variable transmittance obtained by combining light absorption characteristic changes (for example, an absorption coefficient change Δε(λ)) of the plurality of compounds whose light absorption characteristics change, which are contained in the light modulating element according to the present disclosure, is referred to as VT (λ). Here, the change absorption coefficient change Δε(λ) is a change component of the molar absorption coefficient obtained by subtracting the molar absorption coefficient in the transmission state of the compound in which the light absorption characteristics change from the molar absorption coefficient in the light attenuation state of the compound. The variable transmittance VT(λ) is a change component obtained by dividing the transmittance of the light modulating element in the light attenuation state by the transmittance of the light modulating element in the transmission state. Assuming that the absorption coefficient change of a certain compound m in which the light absorption characteristics change is $\Delta\varepsilon_m(\lambda)$, the concentration of the compound in the light attenuation state is $C_m$, and the optical path length of the light modulating element is L, VT(λ) can be described by the following formula. Note that m is not less than 1 and not more than the total number of compounds that change light absorption characteristics used in the light modulating element.

$$VT(\lambda) = 10^{-L\Sigma\Delta\varepsilon_m(\lambda)C_m}$$

where Δε(λ) is an absorption coefficient change of a compound m (m is from 1 to a total number of compounds), $C_m$ is a concentration of the compound m in the light attenuation state, and L is an optical length [m] of the light modulating element.

Examples of the optical path length L and the concentration $C_m$ in the light attenuation state will be described below. For a transmission ND filter, an example of the optical path length L is the thickness of a layer in which a compound whose light absorption characteristics changes are held. In the case where light is reflected at the back surface of the ND filter and travels back and forth inside the ND filter, the optical path length L is twice the thickness of the layer. The concentration $C_m$ is the average concentration of the compound in which the light absorption characteristics change in the light attenuation state in the thickness of the layer in which the compound in which the light absorption characteristics change is held. Here, the light attenuation state refers to a state in which a changeable state of the compound in which the light absorption characteristics change is mostly a state brought in the case where the light modulating element is in the light attenuation state than in the case where the light modulating element is in the transmission state. A specific example is a large state of light absorption in the visible light region of EC compounds or dichroic dyes having a change in light absorption characteristics in the visible light region.

[Wavelength Flatness TF]

Figure 2A:
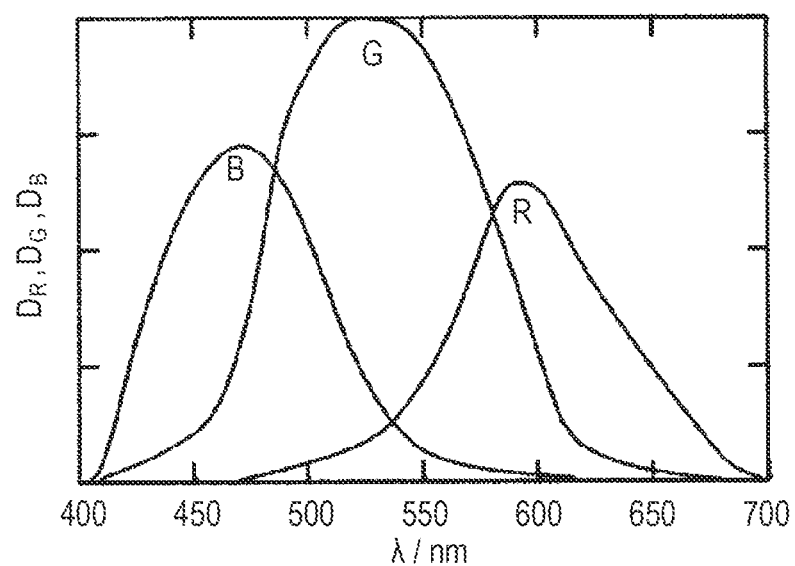
FIG. 2A and FIG. 2B are diagrams illustrating examples of spectral sensitivities of the photodetectors.

A wavelength flatness of VT(λ) in the detection light wavelength region of the photodetector is referred to as TF. The detection light wavelength region of the photodetector refers to a wavelength region in which the photodetector has significant spectral sensitivity. The spectral sensitivity of the photodetector is spectral sensitivity when used in a normal configuration for the photodetector. Specifically, when the photodetector is used as a camera system, it is spectral sensitivity including other optical elements such as UV, IR cut filter, and low pass filter, which are usually used in the camera system. FIG. 2A illustrates an example of spectral sensitivity of the RGB imaging element including influence of transmittance of UV, IR cut filter, and low pass filter when the photodetector is used as a camera system. When the photodetector is a human eye, the color matching function of the CIE corresponds to this.

Figure 2B:
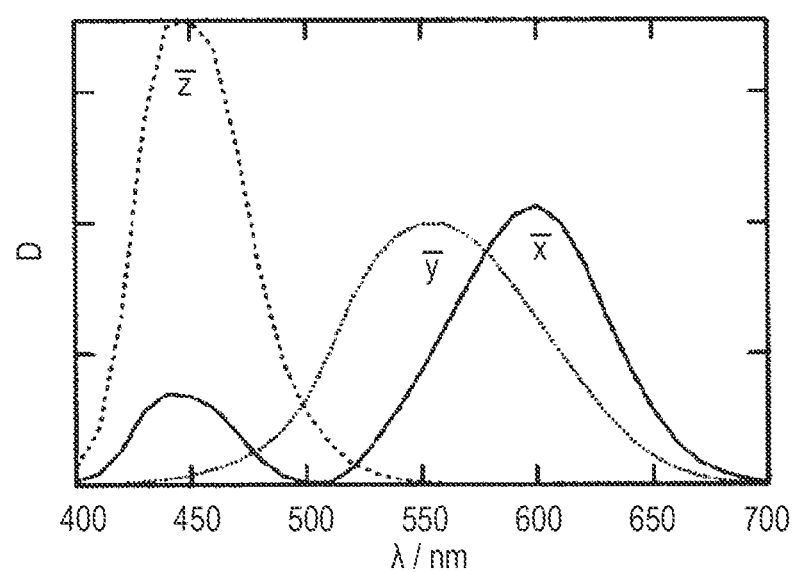

FIG. 2B illustrates the color matching function of the CIE. A typical example of the detection light wavelength region of these photodetectors is a region of 425 nm to 680 nm. One example is a wavelength region having a sensitivity of 10% or more of the maximum spectral sensitivity of the photodetector. The wavelength flatness TF is obtained by dividing the difference between the maximum value and the minimum value of VT(λ) in the detection light wavelength region of the photodetector by the average value as shown in the following formula.

$$TF = \frac{VT(\lambda)_{Max} - VT(\lambda)_{Min}}{VT(\lambda)_{Ave}}$$

[Light Source]

A light of a light source entering the light modulating element (and finally incident on the photodetector through the light modulating element) is described. The light modulating element according to the present disclosure is a light modulating element in which a substantial light source influence on color reproducibility is suppressed. The light source includes a source of light (light source) incident on the light modulating element itself and light emitted from the light source transmitted through a filter or the like. For example, when illumination of an artificial light source is used, not only the artificial light source but also a filter or the like is included when a filter or the like is installed in the artificial light source and used as illumination or the like. For example, considering sunlight on the earth, sunlight transmitted through the atmosphere of the earth and reaching the surface of the earth is included. When the light sources are classified according to the color temperature, the light sources can be classified into three types which is a low color temperature having a color temperature of 4000 K or less, a medium color temperature having a color temperature of 4000 K to 7000 K and a high color temperature having a color temperature of 7000 K or more.

The light modulating element according to the present disclosure reduces the substantial light source influence on color reproducibility by giving higher priority to reducing the ratio between the reference light source and the contrast light source of the change in the detection signal ratio in each of the plurality of detection light wavelength regions of the photodetector. There are two methods for selecting the reference light source and the contrast light source. In order to facilitate understanding, a case where the light modulating element is used as an optical filter of an imaging apparatus will be described as an example. One is a case where the setting (correction) of the imaging apparatus is not changed with the light source, and the other is a case where the setting (correction) of the imaging apparatus is changed with the light source. Each case will be described below.

Figure 3A:
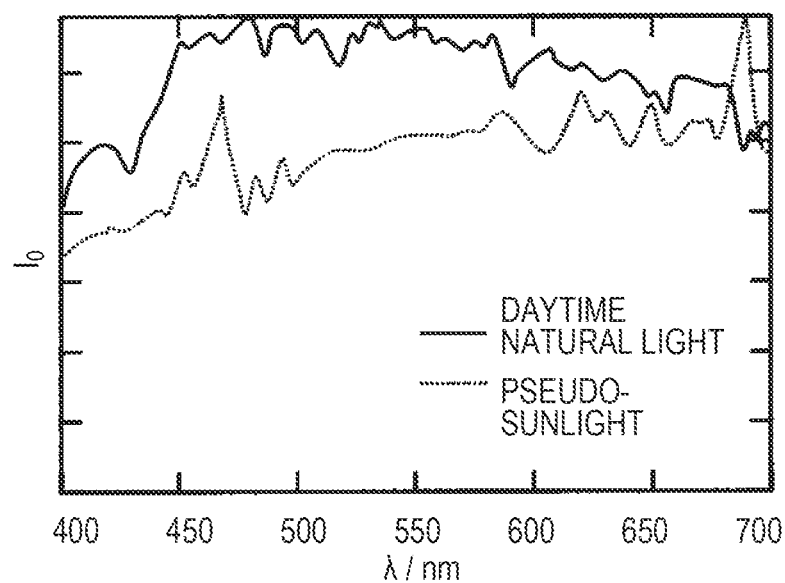
FIG. 3A and FIG. 3B are diagrams illustrating examples of a spectra of light sources.

In the former case, as the reference light source, daytime natural light with high frequency of using a light modulating element is preferably selected, and a light source having a medium color temperature corresponding to the daytime natural light is preferably selected. FIG. 3A illustrates examples of spectra of natural light during daytime and a pseudo-sunlight source at a color temperature of about 5000 K. Examples of defined light sources include CIE D65, CIE D55, CIE D50, B light source, C light source, and the like.

Figure 3B:
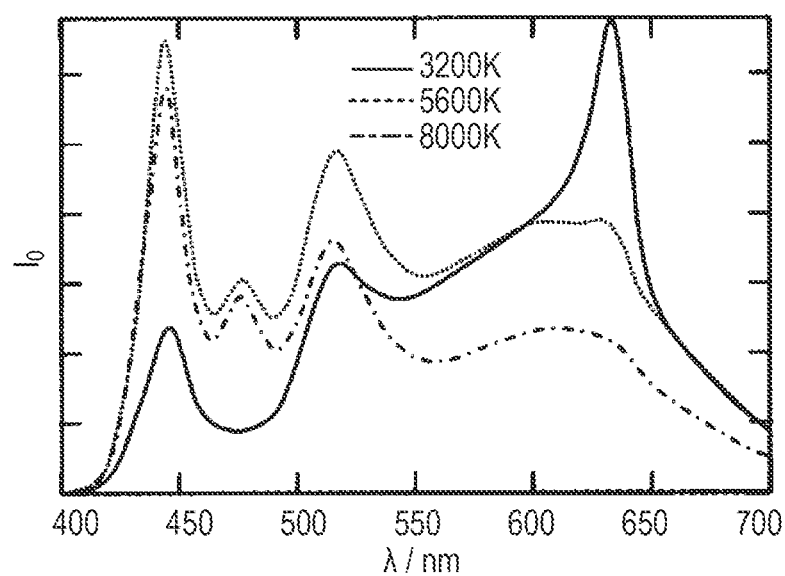

As for the contrast light source relative to the reference light source, by selecting a light source important (used at a relatively high frequency) in the environment in which the light modulating element is used, the ND characteristics of the light modulating element can be highly exhibited. An example of the color temperature of the contrast light source is a color temperature of 2000K to 9000K. As examples of light sources corresponding to respective color temperatures, FIG. 3B illustrates examples of spectra of light sources having color temperatures of 3200K, 5600K and 8000K, respectively. A light source at a low color temperature is important as an artificial light which is traditionally often used, such as sunlight at a low altitude, an incandescent lamp, or a halogen lamp. A light source of medium color temperature is important as artificial light simulating natural light in daytime as a reference light source. A light source of high color temperature is important, for example, when it is desired to express a color in shade. In particular, a light source having a color temperature of 2000 K to 4000 K or 7000 K to 9000 K is important as a contrast light source in view of compatibility with a reference light source having a medium color temperature.

In addition to being compatible with the reference light source, a light source having a color temperature of 2000 K to 4000 K is important as commonly used artificial light. Specific examples of the light source include those listed in the above-described light source of low color temperature, and examples of the defined light source include the A light source of CIE.

In the light modulating element according to the present disclosure, it is preferable that the light modulating element can deal with light sources of a plurality of color temperatures. It is further preferable to be able to deal with a plurality of color temperatures including a medium color temperature. By way of example, it is preferable to deal with a medium color temperature and a low color temperature, a medium color temperature and a high color temperature, and a medium color temperature, a low color temperature and a high color temperature. Here, the ability to deal with a light source having a color temperature means that $NWD_{Max} < NWD_{MaxFP}$ can be realized even when the light source is used. The application region of the light modulating element can be enlarged by being capable of dealing with light sources of a plurality of color temperatures. Specifically, the light modulating element can exhibit high color reproducibility irrespective of the color temperature of the light source. For example, in the case of a camera, high color reproducibility can be realized without identifying the color temperature of a light source.

Figure 14:
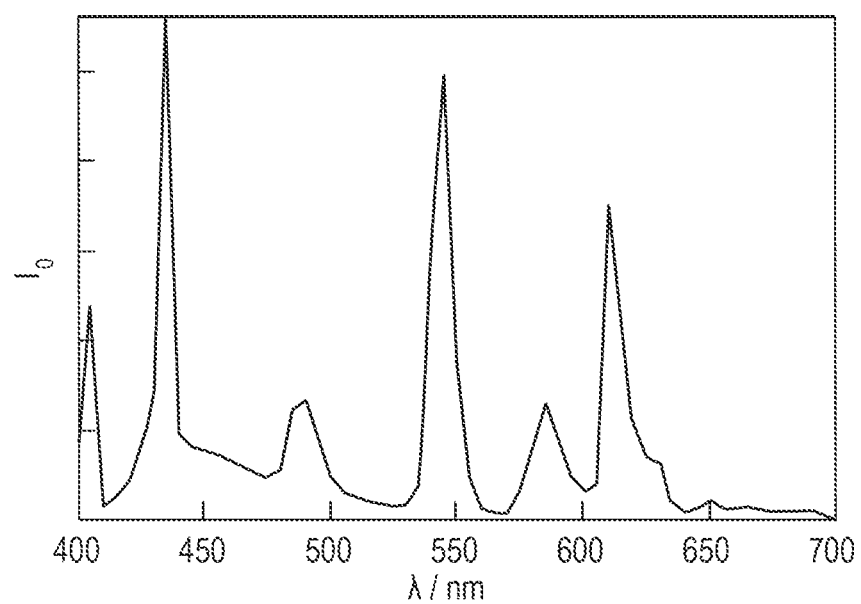
FIG. 14 is a diagram illustrating an example of a spectrum of the light source.

An example of the latter case (the setting (correction) of the imaging apparatus is changed with the light source) is to estimate the color temperature of the light source and change the setting (correction value) of the imaging apparatus for each color temperature. An example of the correction value is a correction value of a white balance. In this case, since the change in the correction value based on the color temperature of the light source is compensated by the correction based on the estimated color temperature of the light source, it is preferable to be able to deal with a plurality of light sources in one color temperature region. Note that, it may be able to correspond to light sources of a plurality of color temperatures. Specifically, the reference light source of the medium color temperature and the reference light source of the medium color temperature are combined. As a rough tendency, in the case where different light sources selected from the same color temperature region are used, the light source influence on color reproducibility is small in many cases as compared with the case where light sources selected from different color temperature regions are used, but there are many exceptional cases. When different light sources selected from the same color temperature region are used, the problem of the light source influence on the color reproducibility increases greatly due to the light source influence having a large spectrum of intensity change. Specific examples thereof include a fluorescent lamp and an LED light source. FIG. 14 illustrates a spectrum of a neutral white fluorescent lamp (color temperature: 5000 K). From this, it can be seen that there is a large change in spectral intensity. In particular, fluorescent lamps have a large influence of emission lines, and are likely to be a problem of the light source influence on color reproducibility. As a method of selecting the reference light source and the contrast light source in the case where such a light source is used, it is preferable to select a light source having a continuous spectrum as the reference light source, and select a light source having a spectrum with a large intensity change as the control light source. Examples of the light source having a continuous spectrum include natural light in daytime, pseudo-sunlight, D65, D55, D50, the B light source, and the C light source as the light source having a medium color temperature. Examples of the light source having a low color temperature include a halogen lamp and the A light source.

In addition, in order to improve color reproducibility of the light modulating element, it is desirable to faithfully reproduce various colors. Therefore, it is preferable to assume the light obtained by reflecting the light source light on samples of various colors as the light incident on the light modulating element. A specific example of the color sample is a color checker (for example, x-rite ColorChecker).

[$NWD_{Max}$]

In the light modulating element according to the present disclosure, the substantial light source influence on color reproducibility is suppressed by giving higher priority to reducing the ratio between the reference light source and the contrast light source in the detection signal ratio change in each of the plurality of detection light wavelength regions of the photodetector rather than increasing the wavelength flatness. $NWD_{Max}$ which is a parameter for realizing this will be described with reference to a schematic diagram of the optical apparatus of FIG. 1.

The variable transmittance of the light modulating element 1001 is referred to as $VT(\lambda)$. The transmission spectrum in the transmission state is referred to as $T0(\lambda)$. The spectral sensitivities of R, G, and B are referred to as $D_R(\lambda)$, $D_G(\lambda)$, and $D_B(\lambda)$, respectively. The incident light 1003 having an $I_n(\lambda)$ spectrum is incident on the optical apparatus 1000 and signal intensities obtained from the photodetector 1002 when the incident light 1003 passes through the light modulating element 1001 are referred to as $S_{Rn}$, $S_{Gn}$, and $S_{Bn}$, respectively. Here, n=0 means the reference light source ($I_0$), and n=1 means the contrast light source ($I_1$). At this time, the signal intensity $S_{RTn}$ ($S_{RT0}$ or $S_{RT1}$), $S_{GTn}$ ($S_{GT0}$ or $S_{GT1}$), and $S_{BTn}$ ($S_{BT0}$ or $S_{BT1}$) in the transmission state are described by the following equations.

$$S_{RTn} = \int_{\lambda_0}^{\lambda_1} I_n(\lambda) T_0(\lambda) D_R(\lambda) d\lambda$$

$$S_{GTn} = \int_{\lambda_0}^{\lambda_1} I_n(\lambda) T_0(\lambda) D_G(\lambda) d\lambda .$$

$$S_{BTn} = \int_{\lambda_0}^{\lambda_1} I_n(\lambda) T_0(\lambda) D_B(\lambda) d\lambda$$

where $\lambda_0$ is a lower limit wavelength in the detection light wavelength region of the photodetector and $\lambda_1$ is an upper limit wavelength in the detection light wavelength region of the photodetector.

Similarly, the signal intensities $S_{RCn}$ ($S_{RC0}$ or $S_{RC1}$), $S_{GCn}$ ($S_{GC0}$ or $S_{GC1}$), and $S_{BCn}$ ($S_{BC0}$ or $S_{BC1}$) of the light modulating element in the light attenuation state (the variable transmittance from the transmission state is referred to as $VT(\lambda)$) are described by the following equations.

$$S_{RCn} = \int_{\lambda_0}^{\lambda_1} I_n(\lambda) T_0(\lambda) VT(\lambda) D_R(\lambda) d\lambda$$

$$S_{GCn} = \int_{\lambda_0}^{\lambda_1} I_n(\lambda) T_0(\lambda) VT(\lambda) D_G(\lambda) d\lambda$$

$$S_{BCn} = \int_{\lambda_0}^{\lambda_1} I_n(\lambda) T_0(\lambda) VT(\lambda) D_B(\lambda) d\lambda$$

The transmittance of the light modulating element in the light attenuation state acts as a transmittance obtained by multiplying the transmission state by the variable transmittance $VT(\lambda)$. The light modulating element in the transmission state has a higher transmittance than the light modulating element in the light attenuation state. Typically, the light modulating element has the highest transmittance. In the case where the color reproducibility given by the spectrum in the state where the transmittance is highest of the light modulating element is low, the transmission state is preferably selected within a range where the spectrum can be effectively used as the light modulating element. A light attenuation ratio (a ratio of the amount of light emitted (transmission state/light attenuation state) in the case light having the same amount of light is incident) between the transmission state and the light attenuation state of the light modulating element is preferably 8 (ND8) or more, and more preferably 32 (ND32) or more. There are two reasons for this.

[1. Usefulness as Light Modulating Element]

If the light attenuation ratio is 8 or less, the adjustable range of the light modulating element is limited, and the applicable range of the light modulating element is strongly limited. If the light attenuation ratio is 32 or more, the possibility of application as a light modulating element is dramatically increased.

[2. Higher Light Attenuation Ratio Makes it Difficult to Achieve High Color Reproducibility]

A light modulating element that absorbs light by combining a plurality of compounds whose light absorption characteristics change is a light absorption element, and a plurality of compounds are combined to form an absorbance spectrum having a specific shape. The shape of the absorbance spectrum is basically (ideally) constant irrespective of the concentration. On the other hand, the amount of light entering the imaging element such as a photodetector or the human eye is determined by "amount of incident light× transmittance". Therefore, in the case where reproducibility is discussed for a color normalized by the amount of light, normalized transmittance is used. Here, since the relationship between the absorbance Abs and the transmittance T is $T=10^{-Abs}$ the influence of the variation depending on the wavelength of the absorbance increases exponentially as the absorbance increases. Therefore, If the light attenuation ratio is as small as 8 or less, the influence of the change in the light attenuation degree of the light modulating element on the color reproducibility is relatively small. On the other hand, if the light attenuation ratio is 8 or more, the influence of the change in the light attenuation degree of the light modulating element on the color reproducibility becomes large, and if the light attenuation ratio is 32 or more, the influence becomes very large. By using the method of the light modulating element according to the present disclosure, high color reproducibility can be provided to the light modulating element even in such a large light attenuation ratio region.

At this time, the signal intensity ratios $W_{RTn}$ ($W_{RT0}$ or $W_{RT1}$) and $W_{BTn}$ ($W_{BT0}$ or $W_{BT1}$) of the R and B detection wavelength regions of the photodetector in the transmission state with reference to G of R, G, and B are described by gains (inverse numbers) with reference to G as shown in the following expressions.

$W_{RTn} = S_{GTn}/S_{RTn}$ $W_{BTn} = S_{GTn}/S_{BTn}$

Similarly, the signal intensity ratios $W_{RCn}$ ($W_{RC0}$ or $W_{RC1}$) and $W_{BCn}$ ($W_{BC0}$ or $W_{BC1}$) of the R and B detection light wavelength regions of the photodetector in the light attenuation state with reference to G are described by gains (inverse numbers) with reference to G as shown in the following expressions.

$W_{RCn} = S_{GCn}/S_{RCn}$ $W_{BCn} = S_{GCn}/S_{BCn}$ $NW_{Rn}$ ($NW_{R0}$ or $NW_{R1}$) or $NW_{Bn}$ ($NW_{B0}$ or $NW_{B1}$) used as the degree of change in the detection signal ratio is described by a change (light attenuation state/transmission state) between the signal intensity ratio in the transmission state and the signal intensity ratio in the light attenuation state as shown in the following expressions.

$NW_{Rn} = W_{RCn}/W_{RTn}$ $NW_{Bn} = W_{BCn}/W_{BTn}$

The ratio $NWD_{Max}$ of the detection signal ratio change between the reference light source and the contrast light source is the largest among the ratio of the reference light source to the contrast light source (reference light source/contrast light source or contrast light source/reference light source) of $NW_{Rn}$ and $NW_{Bn}$. That is, the maximum value among the following four ratios is $NWD_{Max}$.

$NW_{R1}/NW_{R0}$
$NW_{R0}/NW_{R1}$
$NW_{B1}/NW_{B0}$
$NW_{B0}/NW_{B1}$

The minimum value of the wavelength flatness of the transmission spectrum obtained by combining the light absorption characteristic change spectra of a plurality of compounds is referred to as $TF_{FP}$, and $NWD_{Max}$ at that time is referred to as $NWD_{MaxFP}$. The minimum value $TF_{FP}$ and the variable transmittance $VT_{FP}(\lambda)$ providing the $TF_{FP}$ can be calculated by performing a minimization calculation using light absorption characteristic change spectra of a plurality of compounds. Then, $NWD_{MaxFP}$ is calculated using $VT_{FP}(\lambda)$ and the above expression.

In the light modulating element according to the present disclosure, it is preferable to reduce the ratio of the reference light source to the contrast light source of the change in the detection signal ratio in each of a plurality of detection light wavelength regions of the photodetector rather than to increase the wavelength flatness. Therefore, the wavelength flatness TF of the light modulating element according to the present disclosure satisfies $TF > TF_{FP}$ and $NWD_{Max} < NWD_{MaxFP}$.

Preferable values of $NWD_{Max}$ are described. Since the value of $NWD_{Max}$ changes according to the amount of change in the variable transmittance $VT(\lambda)$, it is preferable to perform evaluation with a normalized value. Therefore, the average change amount in a plurality of detection light wavelength regions of the photodetector having the variable transmittance $VT(\lambda)$ is evaluated by a value normalized to be 1/64 (ND64). Since the shape of the variable transmittance spectrum changes according to a change in transmittance, normalization is performed by converting the variable transmittance spectrum into a variable absorbance spectrum (provided by—log ($VT(\lambda)$)) and performing normalization to return to the variable transmittance spectrum. When the simulation image in the case where the light attenuation states of the filter groups having different $NWD_{Max}$ values were passed was evaluated functionally, the range of $NWD_{Max}$ recognized as having no feeling of discomfort in the image was 1.03 or less as compared with the image in the case where the light attenuation states of the same filter were passed. Therefore, a preferable value of $NWD_{Max}$ was 1.03 or less as a value using the variable transmittance $VT(\lambda)$ normalized so that the average change amount became ND64.

[Electrochromic Element (EC Element)]

The light modulating element according to the present disclosure absorbs light by combining a plurality of compounds whose light absorption characteristics change with external stimulation. An EC element using EC compounds is most preferably used because it can achieve both a light transmission state with high transmittance and a light attenuation state with low transmittance. Hereinafter, the light modulating element using the EC element will be described in detail.

Examples of the EC element include those using an inorganic material and those using an organic material, and examples of the former include those using tungsten oxide. As an example using an organic material, there are high-molecular-weight EC element and low-molecular-weight EC elements, and as an example of the former, there is an example using polythiophene. In order to produce a light modulating element with high color reproducibility, it is necessary to precisely control the light absorption characteristics, and from this viewpoint, a low-molecular-weight EC element is preferably used. Specifically, it is preferable to select low-molecular-weight EC compounds having a different light absorption wavelength, and to improve color reproducibility by combining a strong absorption and a weak absorption.

A typical EC element is formed by arranging two transparent conductive electrodes at least one of which is transparent so as to face each other, arranging an EC layer containing EC compounds in a space between the two transparent conductive electrodes, and sealing the periphery with a sealing member. By controlling the voltage between these electrodes, the EC element can be changed from the transmission state to the light attenuation state.

[Electrode]

As the electrode, a material which is stably present in an operating environment of the EC element and which can quickly undergo an oxidation-reduction reaction in response to application of an external voltage is preferably used. As a material of the electrode, for example, a transparent conductive material such as tin-doped indium oxide (ITO) or fluorine-doped tin oxide (FTO), a metal, or the like can be used. Since at least one of the electrodes is a transparent electrode, light can be efficiently taken in from the outside of the EC element and interacted with the EC compounds in the EC layer to reflect the optical characteristics of the EC compounds in the emitted light.

[Sealing Member]

It is preferable that the sealing member is a material that is chemically stable, hard to permeate gas and liquid, and does not inhibit the oxidation-reduction reaction of the EC compounds. For example, an inorganic material such as a glass frit, an organic material such as an epoxy resin or an acrylic resin, a metal, or the like can be used. The sealing member may have a function of holding a distance between two electrodes by an addition of a spacer material, for example. This can define the distance between the electrodes and the optical path length. As a material of the spacer, inorganic materials such as silica beads and glass fibers, and organic materials such as polyimide, polytetrafluoroethylene, polydivinylbenzene, fluorine rubber, and epoxy resin can be used.

[Electrochromic Layer (EC Layer)]

The EC element is classified into a single-electrode EC element in which an electrochemical reaction proceeds at one electrode and a complementary EC element in which an electrochemical reaction proceeds at both electrodes. Although either type of EC element can be used as the light attenuation element according to the present disclosure, the complementary EC element is preferable in order to increase the light attenuation ratio between the transmission state and the light attenuation state of the light modulating element. A typical complementary EC element contains anode EC compounds that changes from a transmission state to a light attenuation state by an oxidation reaction and cathode EC compounds that changes from a transmission state to a light attenuation state by a reduction reaction. Among the typical complementary EC elements, the EC element in which the electrochemical reaction other than the electrochemical reaction of the EC compounds is highly suppressed is preferable as the light modulating element according to the present disclosure because the color change in the light attenuation state is small even when the EC element is operated repeatedly.

In the complementary EC element in which the electrochemical reaction other than the electrochemical reaction of the EC compounds is highly suppressed, the charge used when the reaction of the anode EC compounds proceeds and the charge used when the reaction of the cathode EC compounds proceeds are substantially equal to each other.

Therefore, in such a complementary EC element, when the variable transmittance $VT(\lambda)$ in which the change in the light absorption characteristics of a plurality of compounds are combined is formed, it is necessary to distinguish between the change in the light absorption characteristics of the anode EC compounds and the change in the light absorption characteristics of the cathode EC compounds. Specifically, the total charge concentration of the anode EC compounds in the light attenuation state is substantially equal to the total charge concentration of the cathode EC compounds in the light attenuation state.

Here, the charge concentration in the light attenuation state refers to the charge required to create the concentration of the EC compounds in the light attenuation state, and can be expressed by n×c, where n represents the number of electrons used in the reaction of changing the EC material from the transmission state to the light attenuation state, and c represents the concentration of the EC compounds in the light attenuation state. The fact that total of the charge concentration is substantially equal means that the difference between the total of the charge concentration is 10% or less, preferably 5% or less.

As described above, in the complementary EC element, when the variable transmittance spectrum is formed, there is a limitation on the total charge concentration in the light attenuation state of the anode EC compounds and the charge concentration in the light attenuation state of the cathode EC compounds. As described above, the plurality of compounds are preferably three or more compounds. In order to ensure the degree of freedom in the configuration of the variable transmittance spectrum under the limitation of the charge concentration, it is preferable that the complementary EC element further contains a plurality of both anode EC compounds and cathode EC compounds. This is because, even if the charge concentration is limited as described above, the concentration ratio in the light attenuation state between the anode EC compounds and between the cathode EC compounds can be set with flexibility. This can dramatically increase the effect of optimization by the $NWD_{Max}$ of the present disclosure.

The EC compounds in the EC element may be dissolved in a solvent or the like to form an EC layer or may be immobilized on an electrode. In the case where the EC compounds are immobilized on the electrode, the light attenuation ratio between the transmission state and the light attenuation state can be increased by increasing the concentration of the EC compound to be adsorbed by using a porous electrode as the electrode. In this case, the thickness of the EC layer is a range in which the EC compounds whose transmittance changes exists, and its concentration is an average concentration in the thickness of the EC layer.

The EC compounds are compounds in which the light absorption characteristics repeatedly change in the light wavelength region of the EC element by the oxidation-reduction reaction. Some EC compounds have a relatively small absorbance coefficient change. Since such compounds having a relatively small absorbance coefficient change also changes the light absorption characteristic even though it is small, and contributes to the reaction charge, in calculating the charge concentration described above, calculation is performed by including such compounds having a small absorbance coefficient change as the EC compounds.

Examples of the anode EC compounds include thiophene derivatives, amines having an aromatic ring (for example, phenazine derivatives and triallylamine derivatives), pyrrole derivatives, thiazine derivatives, triallylmethane derivatives, bis(phenyl)methane derivatives, xanthene derivatives, fluoran derivatives and spiropyran derivatives. Among them, the anode EC compound is preferably low-molecular-weight amines having an aromatic ring and most preferably dihydrophenazine derivatives. This is because an EC element having a desired absorption spectrum can be easily provided by using these compounds as the EC compounds, and the EC element has high durability against repeated use. These compounds have an absorption peak in the ultraviolet region in a neutral state (reductant), have no absorption in the visible light region, and have a transmission state in which the transmittance in the visible light region is high. When these molecules become radical cations (oxidants) due to oxidation reaction, the absorption peak shifts to the visible light region and becomes a light attenuation state. The absorption wavelength of these molecules can be appropriately designed by increasing or decreasing the π conjugate length thereof and by changing the substituent to change the π conjugate system. The term "low-molecular-weight" herein refers to a molecular weight of 2000 or less.

The cathode EC compounds are not particularly limited, and examples thereof include pyridine derivatives and quinone compounds. Among them, pyridine derivatives such as viologen derivatives are most preferably used. These compounds typically have an absorption peak in the ultraviolet region in a divalent cation state (oxidant), but do not have absorption in the visible light region, and have a transmission state with high transmittance in the visible light region. When these molecules become radical cation (reductant) by the reduction reaction, the absorption peak is shifted to the visible light region and becomes a light attenuation state. In these molecules, the absorption wavelength can be appropriately designed by increasing or decreasing the π conjugate length thereof and by changing the substituent to change the π conjugate system. The term "low-molecular-weight" herein refers to a molecular weight not containing counter ions of 2000 or less.

[Evaluation Method of Color Reproducibility]

A method of evaluating color reproducibility of the light modulating element according to the present disclosure will be described below. In the light modulating element according to the present disclosure, it is desirable that the color change when the light attenuation degree is changed does not change depending on the light source. Therefore, regarding the color of incident light to the light modulating element in the photodetector, the difference in the change (ratio) between the transmission state and the light attenuation state of the light modulating element when applied to the contrast light source is evaluated with reference to the reference light source. Specifically, since the brightness changes when the light attenuation degree of the light modulating element is changed, the brightness in the transmission state and the light attenuation state of the light modulating element is equalized, and the color difference is plotted on the a*b* plane of the L*a*b* space and evaluated. Numerically, color difference (CIEDE2000($\Delta E_{00}$)) is used for evaluation.

The smaller the value of the color difference, the higher the color reproducibility. Description will be made with reference to the table of NIPPON DENSHOKU INDUSTRIES Co., Ltd., which is widely known as an index.

Grade C tolerance ($\Delta E_{00}$: 6.5 to 13.0): Color difference corresponding to one step in the JIS standard color chart, Munsell color chart, or the like.

Grade B tolerance ($\Delta E_{00}$: 3.2 to 6.5): The impression level is a range which can be handled as the same color, and in the paint industry and plastic industry, a color difference which may be regarded as a different color.

Grade A tolerance (ΔE$_{00}$: 1.6 to 3.2): The color separation comparison is a color difference level that is hardly noticeable and is generally considered to be the same color.

Grade AA tolerance (ΔE$_{00}$: 0.8 to 1.6): Levels at which a slight color difference is perceived in color adjacency comparisons. An allowable color difference range including an error of a general colorimetric engine.

Advantageous Effect

According to the light modulating element of the present disclosure, even in an optical apparatus including a light modulating element containing a plurality of compounds such as a plurality of compounds whose light absorption characteristics change with external stimulation, a substantial light source influence on color reproducibility can be suppressed. The present disclosure gives higher priority reducing the ratio between the reference light source and the contrast light source of the detection signal ratio change in each of the plurality of detection light wavelength regions of the photodetector rather than increasing the wavelength flatness. Thus, the substantial light source influence on the color reproducibility can be further suppressed as compared with the case where the wavelength flatness is improved.

Specifically, the following optical apparatus can be realized. For example, in a camera system in which the amount of light is adjusted by using a variable ND filter, there is a camera system exhibiting high color reproducibility even under various illuminations. Further, there is a transmittance-variable window and a transmittance-variable eyeglasses (sunglasses) showing colors that do not feel discomfort even under various illuminations. Further, there is a transmittance-variable mirror (antiglare mirror) that exhibits a color that does not feel discomfort even under various illuminations.

EXAMPLE

Hereinafter, the light modulating element according to the present disclosure will be described with Examples. Specifically, EC elements each provided with a variable ND filter using a complementary EC element that absorbs light by combining a plurality of EC materials whose light absorption characteristics change electrically will be described as examples. However, the present disclosure is not limited to these Examples.

[EC Compounds]

<Anode EC Compounds>

The anode EC compounds used in the present Examples are shown below. However, EC compounds used in the present disclosure are not limited thereto.

(1)

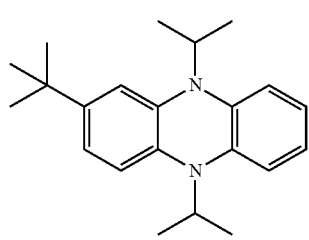

(2)

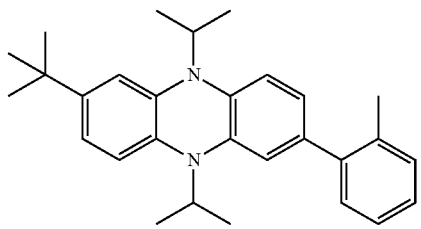

(3)

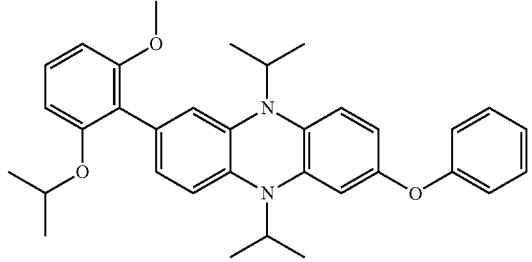

(4)

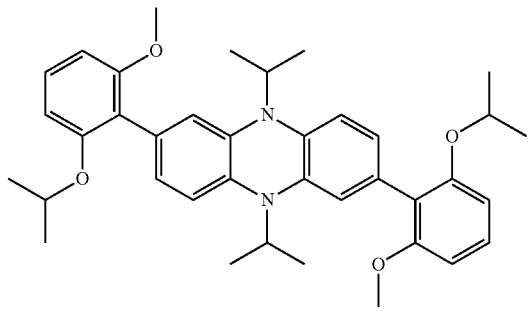

(5)

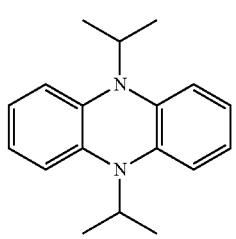

The EC compounds (1) to (5) can be synthesized by using a reaction represented by the following formula (A).

(A)

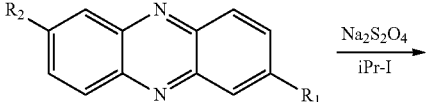

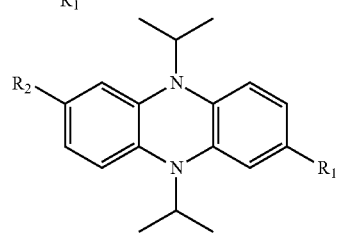

In formula (A), R$_1$ represents a hydrogen atom, an alkyl group or a phenoxy group, and R$_2$ represents a hydrogen atom, an alkyl group or an aryl group. The EC compounds (1) to (5) can be synthesized by reducing a phenazine ring and performing isopropylation.

With respect to the EC compounds (2) to (4), prior to the reaction of the above formula (A), a precursor can be synthesized by a coupling reaction using a known Pd catalyst using a combination of a halogen (X is halogen) of a substituted phenazine represented by the following formula (B) and a phenyl boronic acid or boronic ester compound having a substituted alkyl group or an alkoxy group at the ortho position ($R_3$ or $R_4$). The $R_1$ position can also be performed in the same manner as the $R_2$ position.

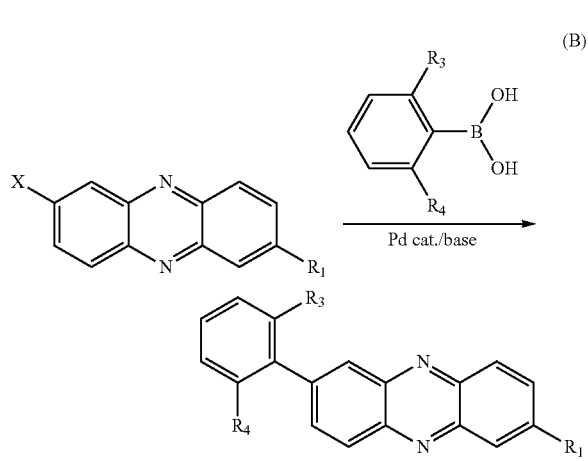

(B)

With respect to the EC compound (3), a phenoxy group at the 7-position of the phenazine ring is introduced prior to the reaction of the above formulae (A) and (B). The phenoxy group can be introduced into the halogen of phenazine by a coupling reaction using a known Cu catalyst using phenol. The synthesis scheme of the EC compound (3) including the specific examples of the reactions of the formulae (A) and (B) is shown in the following formula (C).

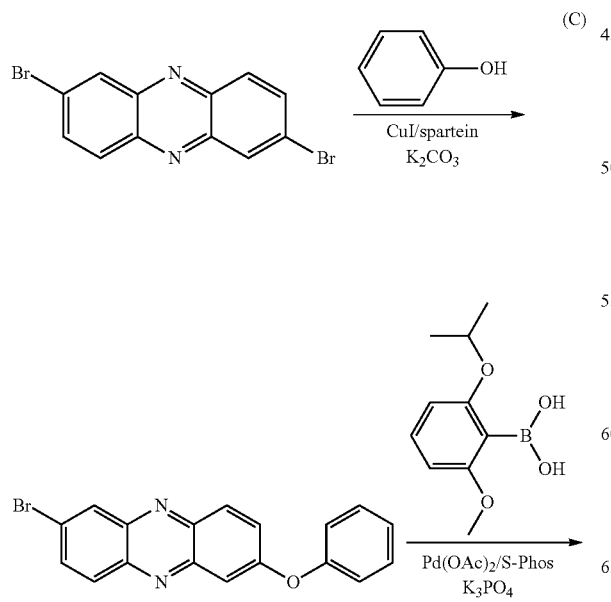

(C)

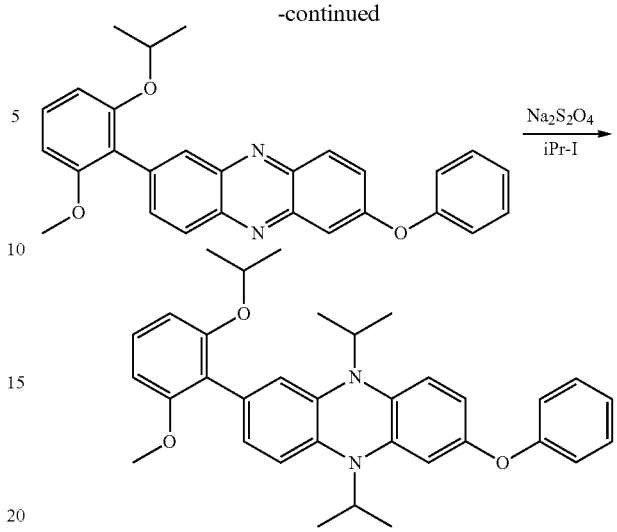

-continued

The EC compound (3) can be synthesized through, for example, by the following procedure. First, a first intermediate was synthesized. 2,7-Dibromophenazine and phenol were mixed with each other in DMSO, and dissolved oxygen was removed with nitrogen. Next, CuI/Spartein complex and potassium carbonate were added and reflux was performed for 8 hours. The reaction solution was concentrated under reduced pressure and purified by silica gel chromatography to obtain a yellow solid first intermediate.

Subsequently, the first intermediate and 2-isopropoxy-6-methoxyphenylboronic acid, were mixed with each other in a toluene/1,4-dioxane mixed solvent, and dissolved oxygen was removed with nitrogen. Pd(OAc)$_2$, 2-dicyclohexylphosphino-2',6'-dimethoxybiphenyl(S-Phos) and tripotassium phosphate were added thereto and reflux was performed for 15 hours. The reaction solution was concentrated under reduced pressure and separated and purified by silica gel chromatography to obtain a yellow solid second intermediate.

Subsequently, the second intermediate and 2-iodopropane, were mixed with each other in an acetonitrile/water mixed solvent, and dissolved oxygen was removed with nitrogen. Sodium hydrosulfite and potassium carbonate were added thereto and reflux was performed for 10 hours. The reaction solution was concentrated under reduced pressure and separated and purified by silica gel chromatography to obtain a solid EC compound (3). $^1$H-NMR (hexadeuteroacetone) δ (ppm): 7.35 (m, 2H), 7.19 (t, 1H), 7.06 (t, 1H), 6.99 (d, 2H), 6.8-6.65 (m, 6H), 6.49 (d, 1H), 6.42 (dd, 1H), 4.47 (sep, 1H), 4.17 (sep, 1H), 3.97 (sep, 1H), 3.71 (s, 3H), 1.51 (d, 6H), 1.46 (d, 6H), 1.18 (d, 6H).

<Cathode EC Compounds>

The cathode EC compounds used in the present Examples are shown below. However, the EC compounds used in the present disclosure are not limited thereto.

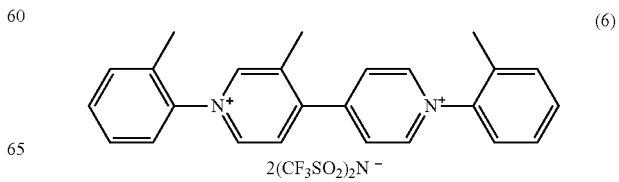

(6)

-continued (7)

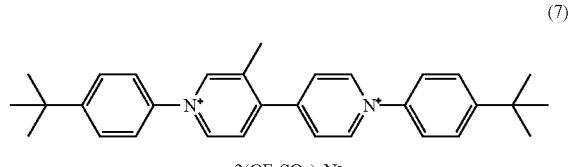

2(CF₃SO₂)₂N⁻

(8)

2(CF₃SO₂)₂N⁻

(9)

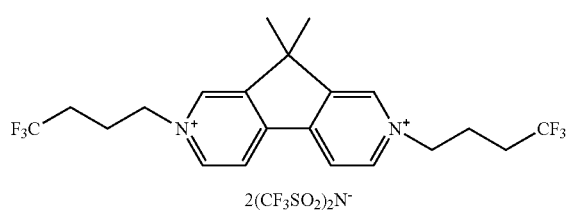

2(CF₃SO₂)₂N⁻

(10)

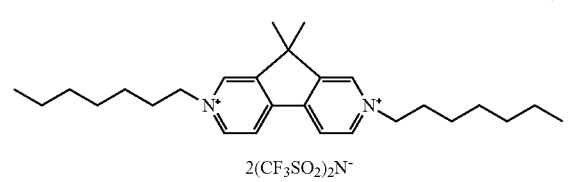

2(CF₃SO₂)₂N⁻

The EC compounds (6) to (8) can be synthesized using a reaction represented by the following formula (D).

(D)

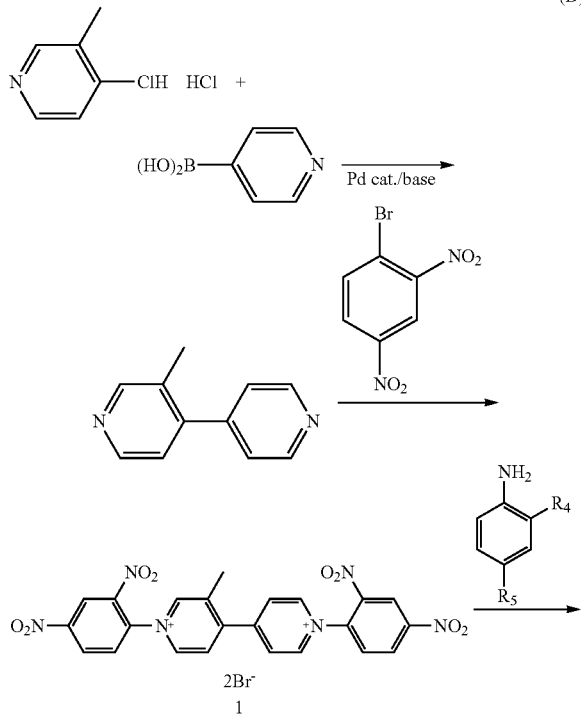

-continued

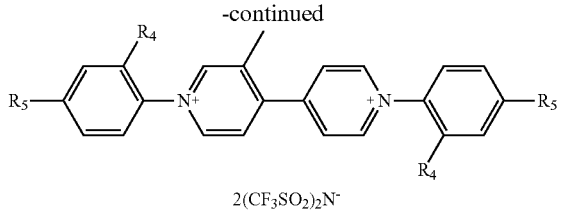

2(CF₃SO₂)₂N⁻

In formula (D), $R_4$ represents a hydrogen atom or a methyl group, and $R_5$ represents a hydrogen atom or an alkyl group. As an example, a specific synthesis method of the EC compound (7) will be described.

The first reaction was performed by reacting 3-methyl-4-chloropyridine hydrochloride, 4-pyridylboronic acid, tris (dibenzylideneacetone) dipalladium (0), tricyclohexylphosphine, and tripotassium phosphate using a dioxane/water solvent in a nitrogen stream under heating for 8 hours. The reaction liquid was concentrated, then extracted with ethyl acetate, and purified by silica gel column chromatography and recrystallization to obtain 3-methyl-4,4'-bipyridine.

The second reaction was performed by reacting the 3-methyl-4,4'-bipyridine, and 2,4-dinitrobromobenzene in an N,N-dimethylformamide solvent at 100° C. for 24 hours. The precipitated crystals were filtered and washed with acetonitrile to obtain an intermediate 1.

The third reaction was performed by refluxing the intermediate 1, o-toluidine using an ethanol solvent for 8 hours. After removing the solvent, ethyl acetate was added, and the precipitate was filtered. The obtained crystal was dissolved in water. An aqueous solution in which bis(trifluoromethanesulfonyl)imidolithium was dissolved was added dropwise thereto. After the resulting mixture was stirred at room temperature for 3 hours, and then recrystallized by adding isopropyl alcohol thereto to obtain an EC compound (7).

$^1$H-NMR (CD₃CN) σ (ppm): 9.00 (d, 2H), 8.89 (s, 1H), 8.83 (d, 1H), 8.33 (d, 2H), 8.12 (d, 1H), 7.76-7.66 (m, 2H), 7.64-7.51 (m, 6H), 2.57 (s, 3H), 2.27 (s, 3H), 2.25 (s, 3H).

The EC compounds (9) and (10) can be synthesized by using a reaction represented by the following formula (E).

(E)

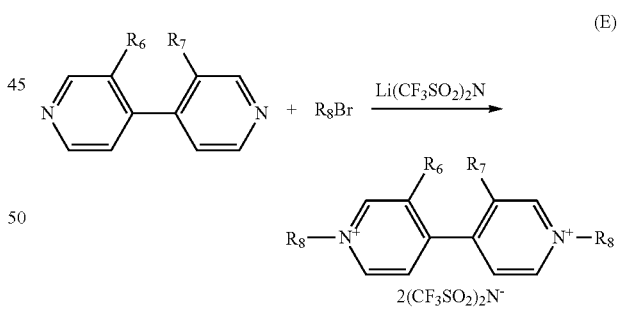

2(CF₃SO₂)₂N⁻

In the above formula (E), $R_6$ and $R_7$ each represents a hydrogen atom or an alkyl group (which forms a ring through $R_6$ and $R_7$). As an example, a specific synthesis method of EC compound (9) is described in Formula (F).

(F)

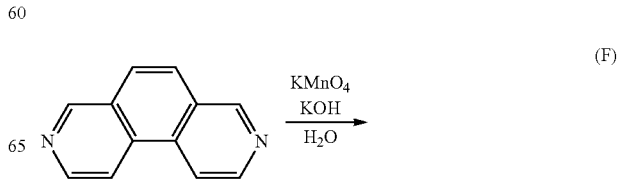

-continued

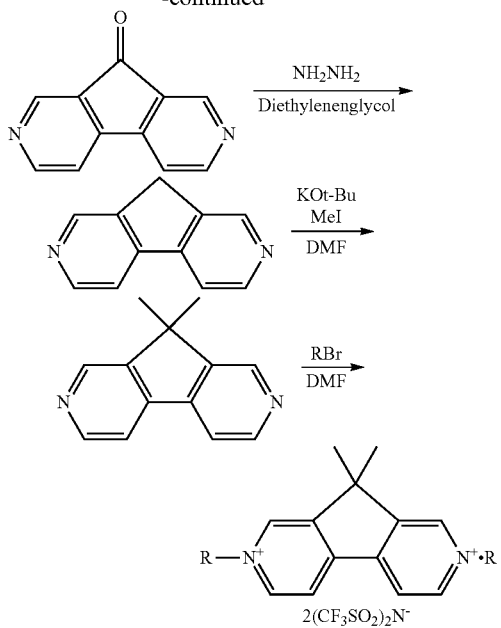

First, a method of synthesizing 9,9-dimethyl-2,7-diazafluorene serving as an intermediate will be described. The synthesis was performed with reference to a technical document (E. Botana, et al., Angew. Chem. Int. Ed. 46, 198-201 (2007)). 3,8-Phenanthroline, potassium hydroxide, and water were charged into a reaction vessel, and heated at 90° C. Then, water and potassium permanganate were mixed with each other. The resulting mixture heated to 90° C. was added dropwise to the reaction solution. After reaction for 1 hour, the precipitated solid was filtered, extracted with chloroform, washed with water and a saturated solution, dried and concentrated to obtain a brown powder. The brown powder was separated and purified by silica gel chromatography to obtain a yellow solid first intermediate.

The first intermediate, diethylene glycol, and hydrazine monohydrate were charged into a reaction vessel and heated at 100° C. for 12 hours. The obtained dark red suspension to which water was added was extracted with dichloromethane, washed with water and saturated saline solution, dried and concentrated to obtain a dark yellow solid. The dark yellow solid was separated and purified by silica gel chromatography to obtain a yellowish brown solid second intermediate.

The second intermediate DMF were charged into a reaction vessel and cooled in an ice bath. Then, potassium tert-butoxide was added thereto and stirred at the same temperature for 30 minutes, and iodomethane diluted with DMF was added dropwise thereto. After stirring was further performed at the same temperature for 30 minutes, the reaction was caused to proceed at room temperature for 3 hours. The obtained reddish brown suspension was added to a saturated sodium bicarbonate solution, extracted with ethyl acetate, washed with water and saturated saline solution, dried and concentrated to obtain a dark yellow solid. The dark yellow solid was separated and purified by silica gel chromatography to obtain a beige solid 9,9-dimethyl-2,7-diazafluorene.

The 9,9-dimethyl-2,7-diazafluorene and an excess amount of 1-bromopeptane were charged into a reaction vessel and reacted using DMF as a solvent at 110° C. for 19 hours. The precipitate was collected and dissolved in water, and an excess amount of bis(trifluoromethanesulfonyl)imidolithium was added thereto. The precipitate was filtered for collection and dried to obtain EC compound (9).

[Production of EC Element]

Two pieces of transparent conductive glass on which an indium-doped tin oxide (ITO) film was formed were prepared, and the ITO films were arranged so as to face each other. The outer circumferences of the two transparent conductive glasses were bonded to each other using a sealing member in which spacer beads having a particle diameter of 50 m were mixed. A solution in which a predetermined EC compound was dissolved was injected from an injection port formed in advance in the transparent conductive glass to fill the space formed by the two transparent conductive glasses and the sealing member with the solution. Then, the injection port was sealed with a sealing member to obtain an EC element.

[Absorption Coefficient Change $\Delta\epsilon(\lambda)$ of EC Compound]

An absorbance change (A value obtained by subtracting the absorbance in the transmission state of the compound from the absorbance in the light attenuation state) spectrum of the single EC compound was obtained. Specifically, the EC compound was dissolved in a 0.1 mol/L solution of tetrabutylammonium hexafluorophosphate in propylene carbonate at a concentration of 1 mmol/L. An absorbance change spectrum was obtained by applying, in a cuvette having an optical path length of 1 mm, a potential at which the EC compound was in a light attenuation state for 120 s, with the platinum mesh electrode as a working electrode, the platinum wire electrode as a counter electrode, and the Ag/Ag$^+$ electrode as a reference electrode.

Next, one type of the anode EC compound and one type of the cathode EC compound were dissolved in propylene carbonate at a concentration of 0.05 mol/L, and the EC element was produced using this solution. In the complementary EC element in which the electrochemical reaction other than the electrochemical reaction of the EC compound is highly suppressed, the amount of charges used to create the light attenuation states of the anode EC compound and the cathode EC compound is equal to each other. Using this fact, the absorption coefficient change of the EC compound having the opposite polarity was determined using the absorbance coefficient change of the reference compound. Here, as the reference compound, 5,10-diisopropyl-5,10-dihydrofenazine ($\Delta\epsilon(480\ nm)=6.5\times10^3\ mol^{-1}\ L\ cm^{-1}$) was used as a reference.

Figure 4A:
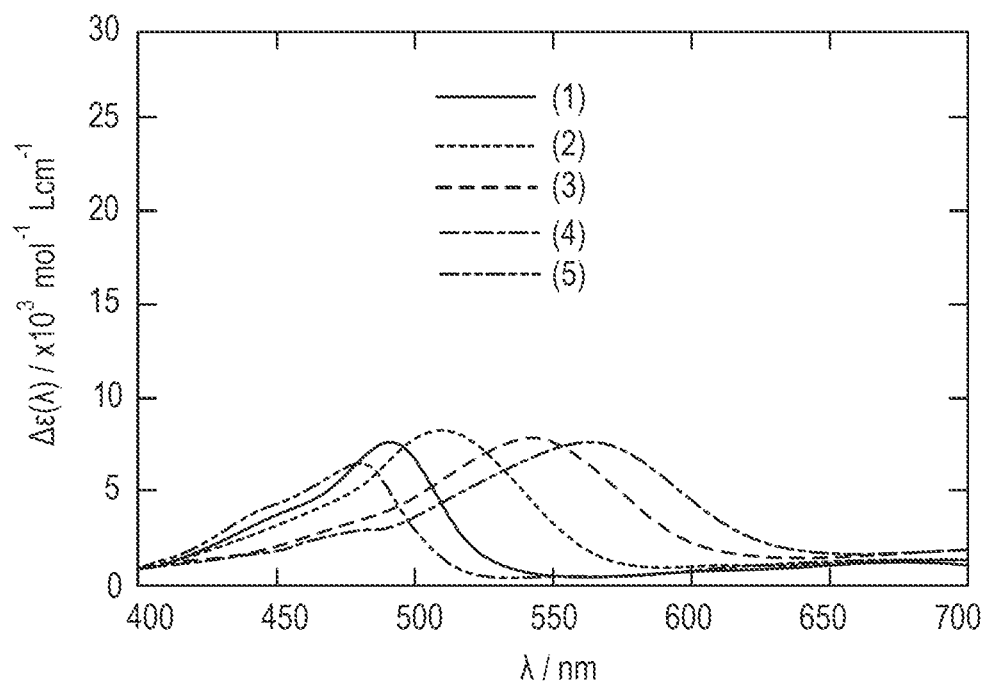
FIG. 4A and FIG. 4B illustrate spectra of the absorption coefficient change of EC compounds used in Examples.
Figure 4B:
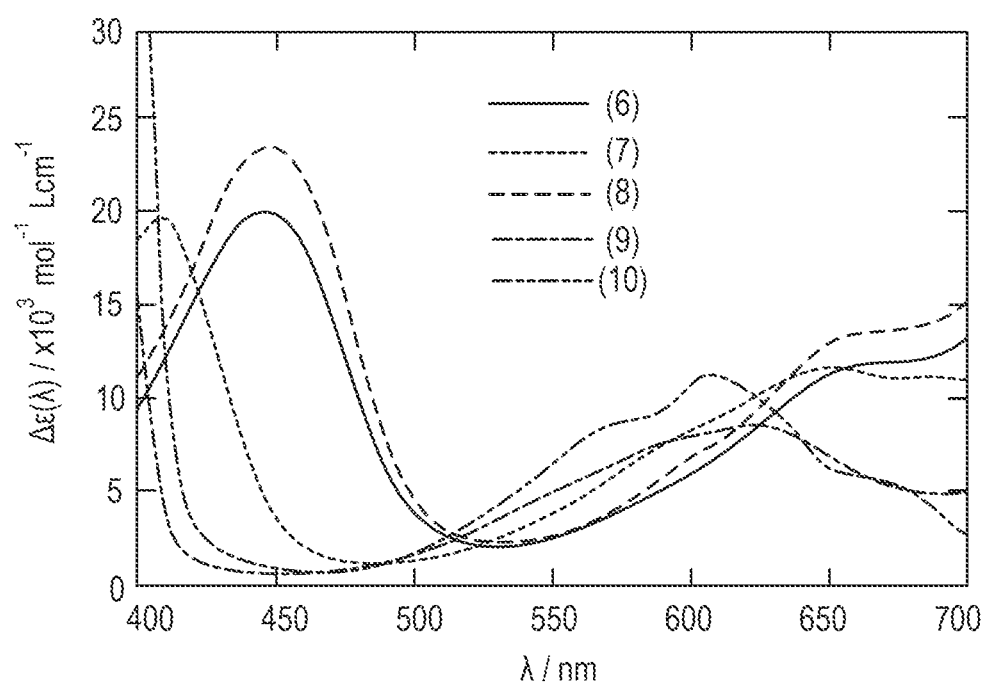

FIG. 4A illustrates absorption coefficient change $\epsilon(\lambda)$ spectra of the EC compounds (1) to (5), and FIG. 4B illustrates absorption coefficient change $\epsilon(\lambda)$ spectra of the EC compounds (6) to (10). Note that, in the present Examples, the variable transmittance $VT(\lambda)$ is calculated after the absorption coefficient change $\epsilon(\lambda)$ is determined because it is a complementary EC element, but it is also possible to directly calculate the variable transmittance $VT(\lambda)$ and the wavelength flatness TF thereof from the absorbance change (without determining $\epsilon(\lambda)$).

Example 1 and Comparative Example 1

An EC element having a variable transmittance $VT(\lambda)$ was formed using the anode EC compounds (1), (2), and (3) and the cathode EC compounds (6), (7), and (9) having the $\Delta\epsilon(\lambda)$ spectrum illustrated in FIGS. 4A and 4B. As the detection light wavelength region of the photodetector at this time, a region of 425 nm or more and 680 nm or less of the photodetector illustrated in FIG. 2A was used. Here, the EC compounds (6), (7) and (9) have peaks in the R region of the photodetector, the EC compounds (2) and (3) have peaks in the G region of the photodetector, and the EC compounds (1) and (6) have peaks in the B region of the photodetector. The light attenuation ratio between the transmission state and the light attenuation state of the EC element was 64 (=average variable transmittance 1.56%).

Figure 5A:
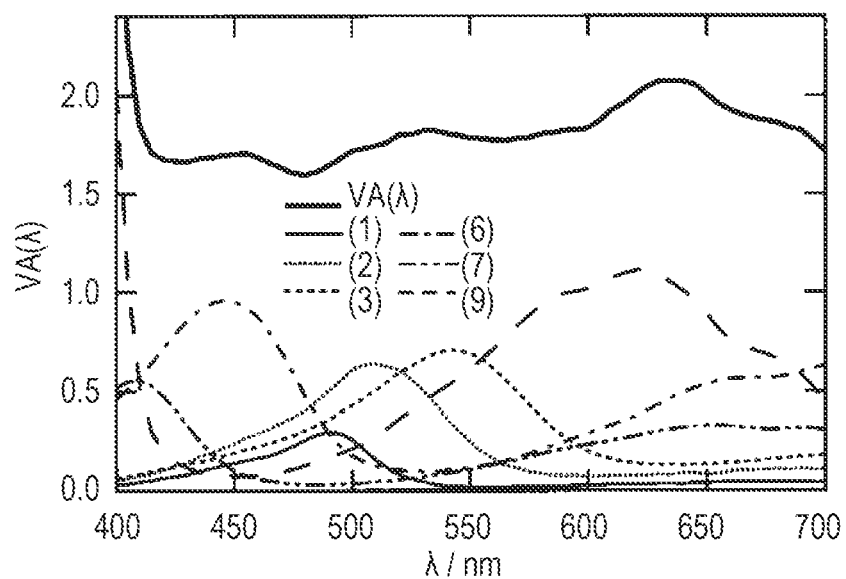
FIG. 5A and FIG. 5B illustrate variable absorbance spectra and variable transmittance spectra of the EC element of Example 1.
Figure 5B:
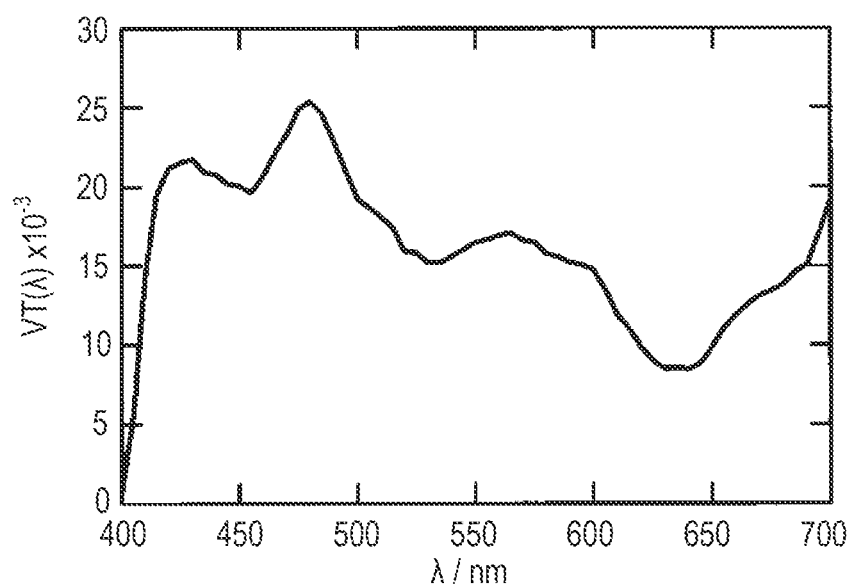
Figure 6A:
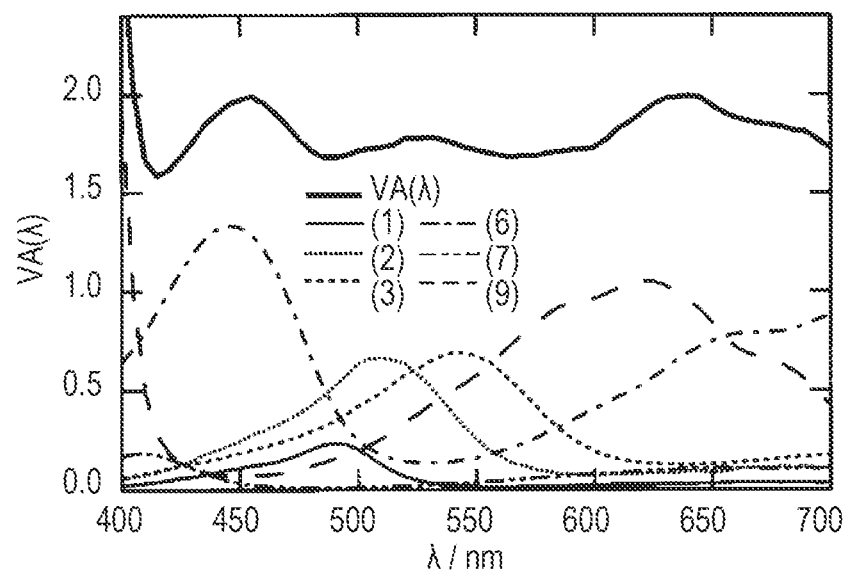
FIG. 6A and FIG. 6B illustrate variable absorbance spectra and variable transmittance spectra of the EC element of Comparative Example 1.
Figure 6B:
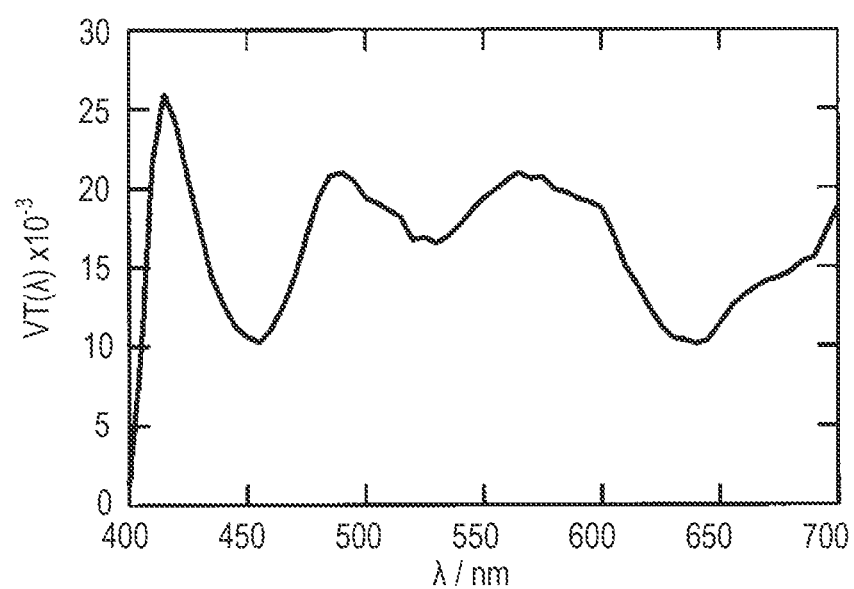

FIGS. 5A and 5B illustrate spectra obtained by combining $\Delta\epsilon(\lambda)$ of a plurality of EC compounds (1), (2), (3), (6), (7), and (9) to reduce $NWD_{Max}$ with respect to various light sources illustrated in FIGS. 3A and 3B. The EC element having the composition of the EC compound at this time was regarded as Example 1, and the total of the concentrations of the EC compounds in the light attenuation state (mmol/L unit) and the charge concentrations of the anode EC compound and the cathode EC compound is shown in Table 1. FIGS. 6A and 6B illustrate spectra obtained by combining EC compounds similar to those in Example 1 to minimize the wavelength flatness of the variable transmittance. The EC element having the EC compound of this composition was defined as Comparative Example 1, and the total of the concentration (mmol/L unit) of each EC compound in a light attenuation state and the charge concentration of each of the anode EC compound and the cathode EC compound is shown in Table 1.

TABLE 1

| | EC compound | | | | | |
|---|---|---|---|---|---|---|
| | (1) | (2) | (3) | (4) | (5) | (6) |
| Example 1 [mmol/L] | 12.7 | 25.8 Total: 68.5 | 30.0 | 15.9 | 9.4 Total: 68.5 | 43.2 |
| Comparative Example 1 [mmol/L] | 10.1 | 26.9 Total: 66.2 | 29.2 | 22.2 | 3.2 Total: 66.3 | 40.9 |

From Table 1, it can be confirmed that the total charge concentration in the light attenuation state of the anode EC compound and the total charge concentration in the light attenuation state of the cathode EC compound are substantially equal at 68.5 mmol/L in Example 1 and 66.2 mmol/L and 66.3 mmol/L in Comparative Example 1.

FIG. 5A illustrates a variable absorbance spectrum $VA(\lambda)$ of the EC element of Example 1, and FIG. 5B illustrates a variable transmittance $VT(\lambda)$ obtained by converting $VA(\lambda)$ of the EC element of Example 1 into a transmittance. FIG. 6A illustrates the variable absorbance spectrum $VA(\lambda)$ of the EC element of Comparative Example 1, and FIG. 6B illustrates the variable transmittance $VT_{FP}(\lambda)$ obtained by returning the $VA(\lambda)$ of the EC element of Comparative Example 1 to the transmittance.

The wavelength flatness TF in the detection light wavelength region was 103% in Example 1 and 67.6% in Comparative Example 1, and the wavelength flatness TF in Comparative Example 1 was the lowest wavelength flatness $TF_{FP}$ in the combination of EC compounds used.

Table 2 shows the values of $NWD_{Max}$ calculated using the spectrum of the daytime natural light illustrated in FIG. 3A as the reference light source, and the A light source, the halogen lamp, and five types of light sources from the low color temperature to the high color temperature of the spectra of the color temperatures illustrated in FIG. 3B as the contrast light source.

TABLE 2

| | | Reference Light Source Daytime Natural Light Contrast Light Source | | | | |
|---|---|---|---|---|---|---|
| | | A Light Source | Halogen Lamp | 3200K | 5600K | 8000K |
| $NWD_{Max}$ | Example 1 | 1.0138 | 1.0124 | 1.0034 | 1.0067 | 1.0098 |
| | Comparative Example 1 | 1.0414 | 1.0387 | 1.0381 | 1.0350 | 1.0409 |

From the comparison of Table 2, it was confirmed that the EC element of Example 1 was able to correspond to the medium color temperature, the low color temperature, and the high color temperature as compared with the EC element of Comparative Example 1.

Figure 7A:
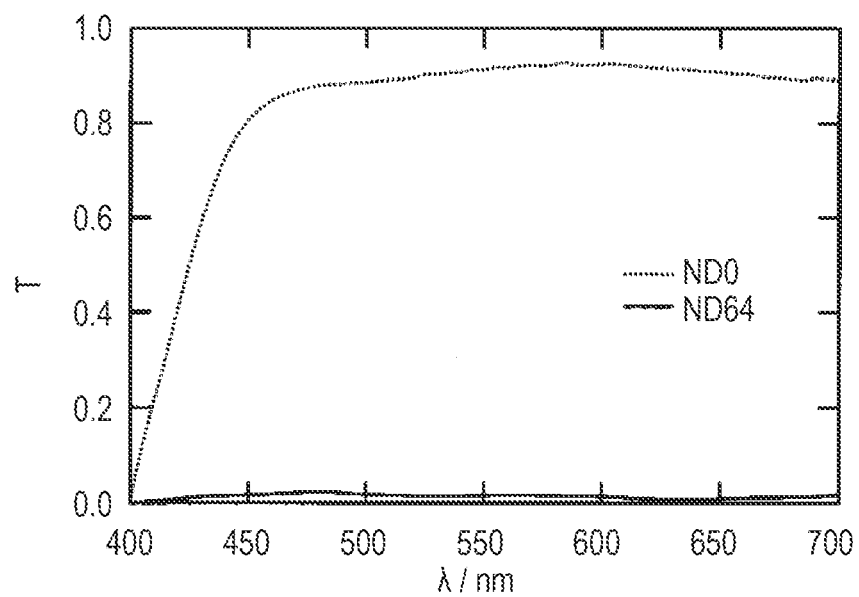
FIG. 7A and FIG. 7B illustrate transmission spectra of the EC elements of Example 1 and Comparative Example 1 in a transmission state and a light attenuation state.
Figure 7B:
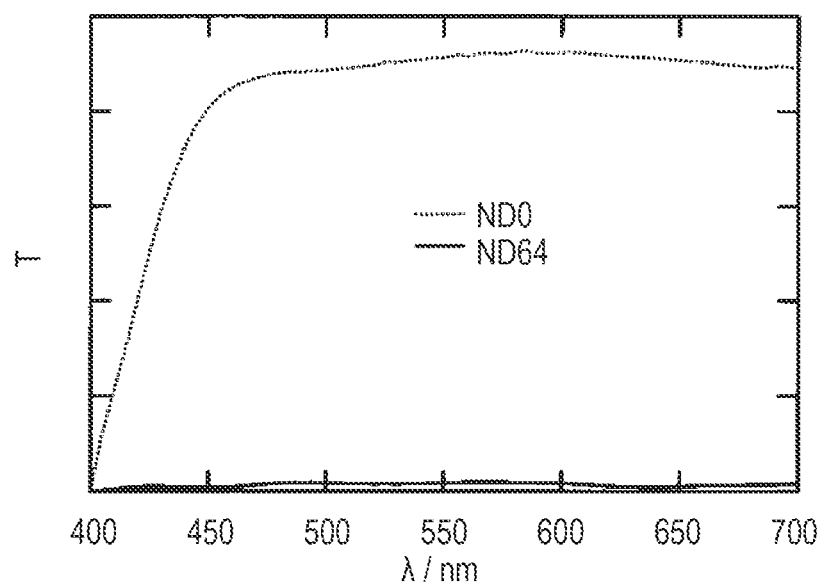
Figure 8A:
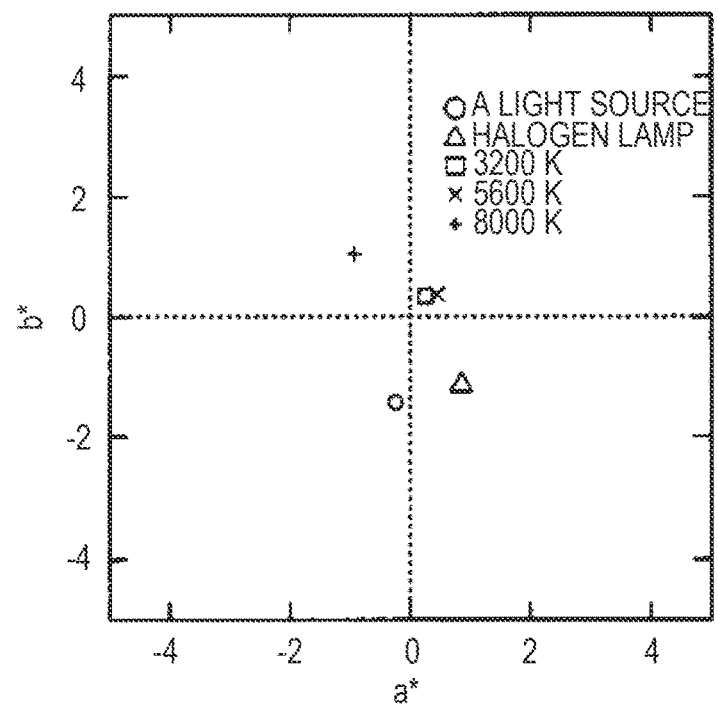
FIG. 8A is a diagram illustrating the evaluation result of the light source influence on the color reproducibility of the EC element of Example 1.
Figure 8B:
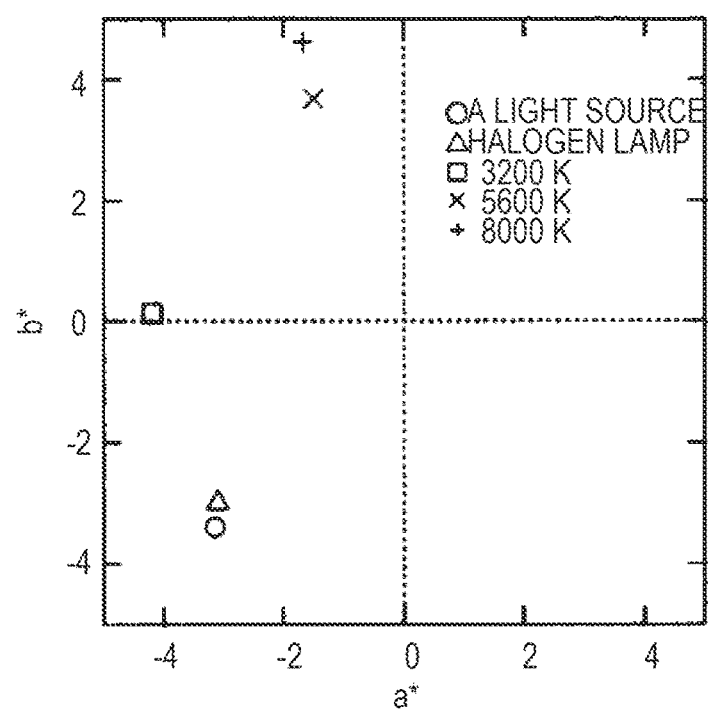
FIG. 8B is a diagram illustrating the evaluation result of the light source influence on the color reproducibility of the EC element of Comparative Example 1.

FIG. 7A illustrates transmission spectra of Example 1, and FIG. 7B illustrates transmission spectra of Comparative Example 1 in a transmission state (ND0) and a light attenuation state (ND64) of each EC element. FIG. 8A illustrates the results of evaluation of the light source influence on color reproducibility for the EC element of Example 1 and FIG. 8B illustrates the results of evaluation of the light source influence on color reproducibility for the EC element of Comparative Example 1, using the following conditions.

Transmission spectrum: FIG. 7A and FIG. 7B.

Spectral Sensitivities: FIG. 2A

Reference light source: The daytime natural light spectrum illustrated in FIG. 3A.

Contrast light source: A light source, halogen lamp, color temperature spectrum illustrated in FIG. 3B In the evaluation, first, using the light source light (object reflectance=1) of the reference light source, a white balance change (fold) when the EC element is changed from the transmission state to the light attenuation state is acquired, and a correction value is calculated to compensate for this change (to make the change zero). Next, white balance is performed on the light source light (object reflectance=1) of the contrast light source in the transmission state (ND0) of the EC element, and the correction value of the reference light source acquired earlier is applied. The color of the light attenuation state of the EC element in which the luminance at this time was normalized was plotted on the a*b* plane of the L*a*b* space. In this figure, the closer the plot of the light attenuation state is to the origin (the transmission state of the EC element subjected to the white balance), the higher the color reproducibility. In other words, the light source influence on color reproducibility is small. The meaning means that a white image as a subject is also expressed as white even if the degree of light attenuation is changed by using different light sources.

When FIG. 8A and FIG. 8B are compared, in Example 1 in which $NWD_{Max}$ is prioritized, the plot of the light attenuation state is closer to the origin (transmission state) than in Comparative Example 1 in which wavelength flatness is prioritized. From this, it can be seen that the EC element of Example 1 in which $NWD_{Max}$ is prioritized can reduce the light source influence on color reproducibility as compared with the EC element of Comparative Example 1 in which wavelength flatness is prioritized. Table 5 shows the values of the color difference ($\Delta E_{00}$) between the light attenuation state (plot) and the transmission state (origin) when the contrast light sources illustrated in FIG. 8A and FIG. 8B are used.

TABLE 3

| | | Reference Light Source | | | | |
| | | Daytime Natural Light | | | | |
| | | Contrast Light Source | | | | |
| | | A Light Source | Halogen Lamp | 3200K | 5600K | 8000K |
|---|---|---|---|---|---|---|
| $\Delta E_{00}$ | Example 1 | 1.43 | 1.65 | 0.50 | 0.77 | 1.67 |
| | Comparative Example 1 | 5.16 | 4.93 | 5.50 | 3.94 | 4.71 |

From this, it has been found that even when the same EC compound is combined, the light source influence can be suppressed in the case where $NWD_{Max}$ is prioritized as in the present disclosure, as compared with the case where wavelength flatness is prioritized. Specifically, it was found that the light source influence can be suppressed by 2.8 to 11 times for all five kinds of contrast light sources from the low color temperature to the high color temperature. In addition, functionality evaluation of a simulation image was performed when the EC element of the Example was installed as a variable ND filter in a camera having an imaging element and the light source was changed. It was recognized that the EC element of the Example had a small feeling of discomfort in both the reference light source and the contrast light source when compared with the images in the transmission state and the light attenuation state of the element. From this, it was found that good color reproducibility was obtained by setting the value of $NWD_{Max}$ to 1.03 or less as a value using the variable transmittance $VT(\lambda)$ normalized so that the average change amount was ND64.

Figure 9:
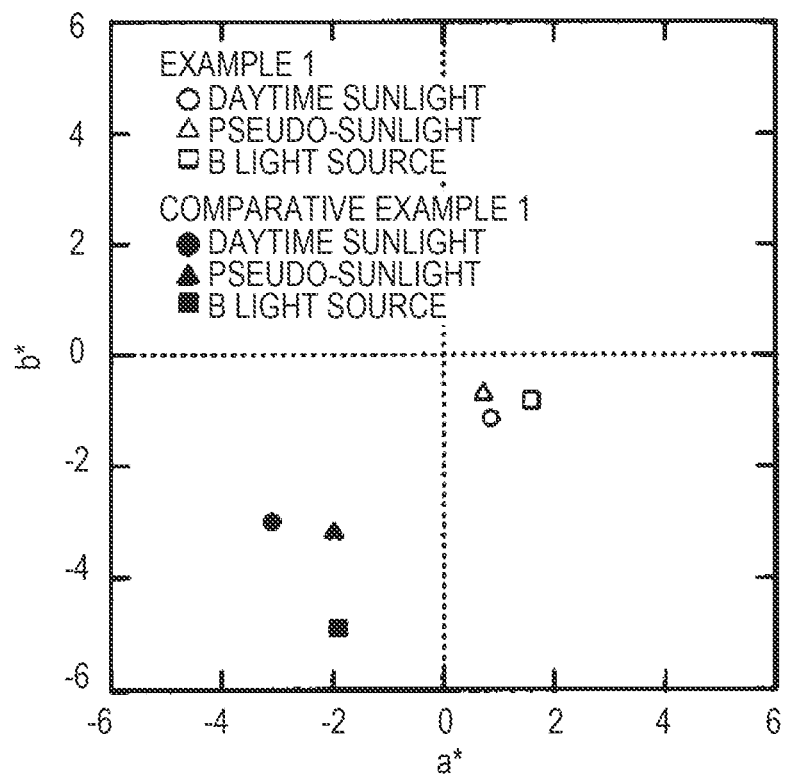
FIG. 9 is a diagram illustrating the evaluation result of the light source influence on the color reproducibility of the EC elements of Example 1 and Comparative Example 1.

Table 4 shows the values of $NWD_{Max}$ in the EC elements of Example 1 and Comparative Example 1 when the reference light source and the contrast light source were changed, and FIG. 9 illustrates the results of evaluating the light source influence on color reproducibility in the same manner as described above.

TABLE 4

| | | Reference Light Source | | |
| | | Daytime Natural Light | pseudo-sunlight source | B light Source |
| | Contrast Light Source | | Halogen Lamp | |
|---|---|---|---|---|
| $NWD_{Max}$ | Example 1 | 1.0124 | 1.0078 | 1.0115 |
| | Comparative Example 1 | 1.0387 | 1.00304 | 1.0457 |

From the comparison of Table 4, it was confirmed that the EC element of Example 1 was able to correspond to the medium color temperature and the low color temperature as compared with the EC element of Comparative Example 1. From FIG. 9, the plot of the light attenuation state of the contrast light source is closer to the origin (transmission state) than the plot of Comparative Example 1 in the plot of Example 1. From this, it can be seen that the EC element of Example 1 can reduce the light source influence on color reproducibility as compared with the EC element of Comparative Example 1. Table 7 shows the values of the color difference ($\Delta E_{00}$) between the light attenuation state (plot) and the transmission state (origin) when the reference light sources illustrated in FIG. 9 are used.

TABLE 5

| | | Reference Light Source | | |
| | | Daytime Natural Light | pseudo-sunlight source | B Light Source |
| | Contrast Light Source | | Halogen Lamp | |
|---|---|---|---|---|
| $\Delta E_{00}$ | Example 1 | 1.65 | 1.25 | 2.38 |
| | Comparative Example 1 | 4.93 | 3.98 | 5.04 |

From this, it has been found that even when the same EC compound is combined, the light source influence can be suppressed in the case where $NWD_{Max}$ is prioritized as in the present disclosure, as compared with the case where wavelength flatness is prioritized. Specifically, it was found that the light source influence can be suppressed by 2.1 to 3.2 times for all three kinds of reference light sources. In addition, functionality evaluation of a simulation image was performed when the EC element of the Example was installed as a variable ND filter in a camera having an imaging element and the light source was changed. It was recognized that the EC element of the Example had a small feeling of discomfort in both the reference light source and the contrast light source when compared with the images in the transmission state and the light attenuation state of the element. From this, it was found that good color reproducibility was obtained by setting the value of $NWD_{Max}$ to 1.03 or less as a value using the variable transmittance $VT(\lambda)$ normalized so that the average change amount was ND64.

Examples 2 and 3

Figure 10:
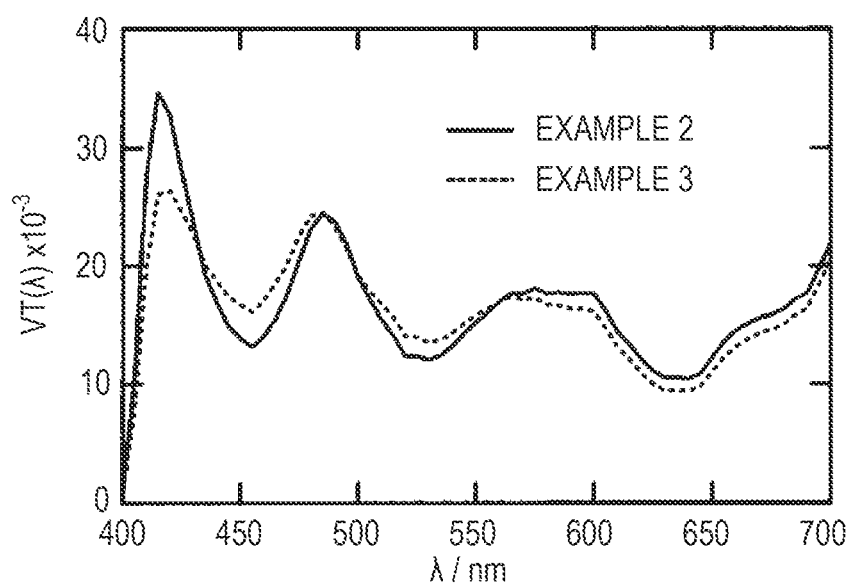
FIG. 10 illustrates variable transmittance spectra of the EC elements of Examples 2 and 3.

FIG. 10 illustrates $VT(\lambda)$ of the EC elements of Examples 2 and 3 in which EC layers were formed in different compositions (concentration ratios) by using the same EC compound group as in Example 1. The wavelength flatness TF in the detection light wavelength region was 110% in Example 2 and 97.5% in Example 3. The concentration of each EC compound in a light attenuation state (mmol/L unit) and the total charge concentration of each of the anode EC compound and the cathode EC compound are shown in Table 6.

TABLE 6

| | EC Compound | | | | | |
|---|---|---|---|---|---|---|
| | (1) | (2) | (3) | (4) | (5) | (6) |
| Example 2 [mmol/L] | 3.1 | 32.3 Total: 66.5 | 31.1 | 20.6 | 1.7 Total: 66.6 | 44.3 |
| Example 3 [mmol/L] | 7.9 | 29.1 Total: 67.6 | 30.6 | 18.3 | 5.5 Total: 67.5 | 43.7 |

From Table 6, it can be confirmed that the total of the charge concentrations of the light attenuation states of the anode EC compounds of Examples 2 and 3 and the total of the charge concentrations of the light attenuation states of the cathode EC compounds of Examples 2 and 3 are substantially equal to each other at 66.5 mmol/L, 66.6 mmol/L, 67.6 mmol/L, and 67.5 mmol/L, respectively. Table 7 shows values of $NWD_{Max}$ and wavelength flatness TF calculated by using the spectrum of daytime natural light illustrated in FIG. 3A as a reference light source and using a halogen lamp as a contrast light source. Table 7 also shows the values of $NWD_{Max}$ and wavelength flatness of Example 1 (NWD$_{Max}$ priority) and Comparative Example 1 (wavelength flatness priority) formed using the same compound group.

From Table 7, it was confirmed that the EC elements of Examples 1 to 3 can correspond to the medium color temperature and the low color temperature more than the EC element of Comparative Example 1.

Figure 11:
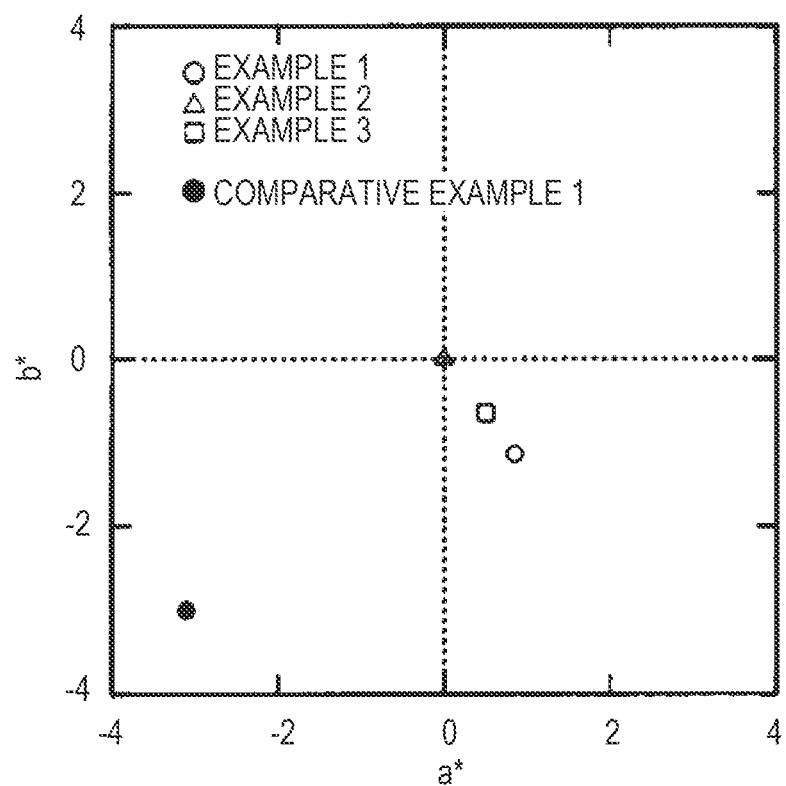
FIG. 11 is a diagram illustrating the evaluation result of the light source influence on the color reproducibility of the EC elements of Examples 2 and 3.

FIG. 11 illustrates the results of evaluating the light source influence on color reproducibility when daytime natural light illustrated in FIG. 3A is used as the reference light source and a halogen lamp is used as the contrast light source in the EC elements of Examples 1 to 3 and Comparative Example 1. From FIG. 11, in Examples 1 to 3, the plot of the light attenuation state of the contrast light source is closer to the origin (transmission state) than in Comparative Example 1. From this, it can be seen that the EC elements of Examples 1 to 3 in which NWD$_{Max}$ is prioritized can reduce the light source influence on color reproducibility as compared with the EC element of Comparative Example 1 in which wavelength flatness is prioritized. Table 7 shows the values of the color difference ($\Delta E_{00}$) between the light attenuation state (plot) and the transmission state (origin) illustrated in FIG. 11.

TABLE 7

| | Example 1 | Example 2 | Example 3 | Comparative Example 1 |
|---|---|---|---|---|
| NWD$_{Max}$ | 1.0124 | 1.0010 | 10071 | 1.0387 |
| TF [%] | 103 | 110 | 97.5 | 67.6 |
| $\Delta E_{00}$ | 1.65 | 0.97 | 0.002 | 4.93 |

From Table 7, it was found that even when the same EC compound was combined, the light source influence was able to be suppressed in the composition in which NWD$_{Max}$ was prioritized as in the present disclosure, as compared with the composition in which wavelength flatness was prioritized. Specifically, it has been found that the light source influence can be suppressed by about three times or more with respect to all three kinds of concentration ratios. In addition, functionality evaluation of a simulation image was performed when the EC element of the Example was installed as a variable ND filter in a camera having an imaging element and the light source was changed. It was recognized that the EC element of the Example had a small feeling of discomfort in both the reference light source and the contrast light source when compared with the images in the transmission state and the light attenuation state of the element. From this, it was found that good color reproducibility was obtained by setting the value of NWD$_{Max}$ to 1.03 or less as a value using the variable transmittance VT($\lambda$) normalized so that the average change amount was ND64.

EC elements of Examples 4 and 5 and Comparative Examples 2 and 3 were produced by changing combinations and compositions of EC compounds having spectra illustrated in FIG. 4A and FIG. 4B. In Example 4 and Comparative Example 2, the EC layer was formed using the anode EC compounds (1), (4), and (5) and the cathode EC compounds (6), (7), and (9). In Example 5 and Comparative Example 3, the EC layer was formed using the anode EC compounds (1), (2), and (3) and the cathode EC compounds (8), (9), and (10). The EC compounds (6) to (10) have peaks in the R region of the photodetector, the EC compounds (2) to (4) have peaks in the G region of the photodetector, and the EC compounds (1), (5), (6) and (8) have peaks in the B region of the photodetector. The light attenuation ratio between the transmission state and the light attenuation state of each EC element was 64 (=average variable transmittance 1.56%). As the detection light wavelength region of the photodetector, a region of 425 nm or more and 680 nm or less of the photodetector illustrated in FIG. 2A was used.

Figure 12:
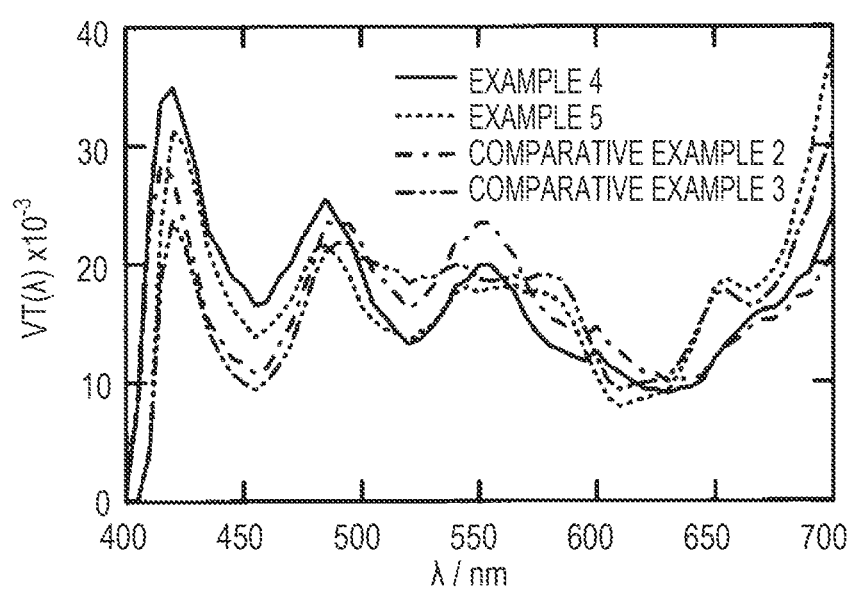
FIG. 12 illustrates variable transmittance spectra of the EC elements of Examples 4 and 5 and Comparative Examples 2 and 3.

FIG. 12 illustrates variable transmittance VT($\lambda$) spectra of Examples 4 and 5 and Comparative Examples 2 and 3. Table 8 shows the total concentration (mmol/L unit) of each EC compound in a light attenuation state, and the total charge concentration of each of the anode EC compound and the cathode EC compound.

TABLE 8

| | EC Compound | | | | | | | | | |
|---|---|---|---|---|---|---|---|---|---|---|
| | (1) | (2) | (3) | (4) | (5) | (6) | (7) | (8) | (9) | (10) |
| Example 4 [mmol/L] | 43.5 | — | — | 20.9 | 3.9 | 17.9 | 3.0 | — | 47.4 | — |
| | | Total: 68.3 | | | | | | Total: 68.3 | | |
| Example 5 [mmol/L] | 7.0 | 41.4 | 15.1 | — | — | — | — | 16.4 | 38.2 | 8.9 |
| | | Total: 63.5 | | | | | | Total: 63.5 | | |
| Comparative Example 2 [mmol/L] | 40.1 | — | — | 20.9 | 5.6 | 21.2 | 2.9 | — | 42.6 | — |
| | | Total: 66.6 | | | | | | Total: 66.7 | | |
| Comparative Example 3 [mmol/L] | 9.2 | 31.3 | 20.8 | — | — | — | — | 19.6 | 36.5 | 5.2 |
| | | Total: 61.3 | | | | | | Total: 61.3 | | |

From Table 8, it can be confirmed that the total of the charge concentrations in the light attenuation state of the anode EC compounds and the total of the charge concentrations in the light attenuation state of the cathode EC compounds of Examples 4 and 5 are substantially equal to each other at 68.3 mmol/L and 63.5 mmol/L, respectively. In addition, it can be confirmed that the total of the charge concentrations in the light attenuation state of the anode EC compounds of Comparative Examples 2 and 3 and the total of the charge concentrations in the light attenuation state of the cathode EC compounds of Comparative Examples 2 and 3 are substantially equal to each other at 66.6 mmol/L, 66.7 mmol/L, and 61.3 mmol/L, respectively.

Table 9 shows the values of NWD$_{Max}$ calculated using the daytime natural light spectrum illustrated in FIG. 3A as a reference light source and using a halogen lamp as a contrast light source. From Table 9, it can be confirmed that Examples 1, 4, and 5 can correspond to a medium color temperature and a low color temperature.

Figure 13:
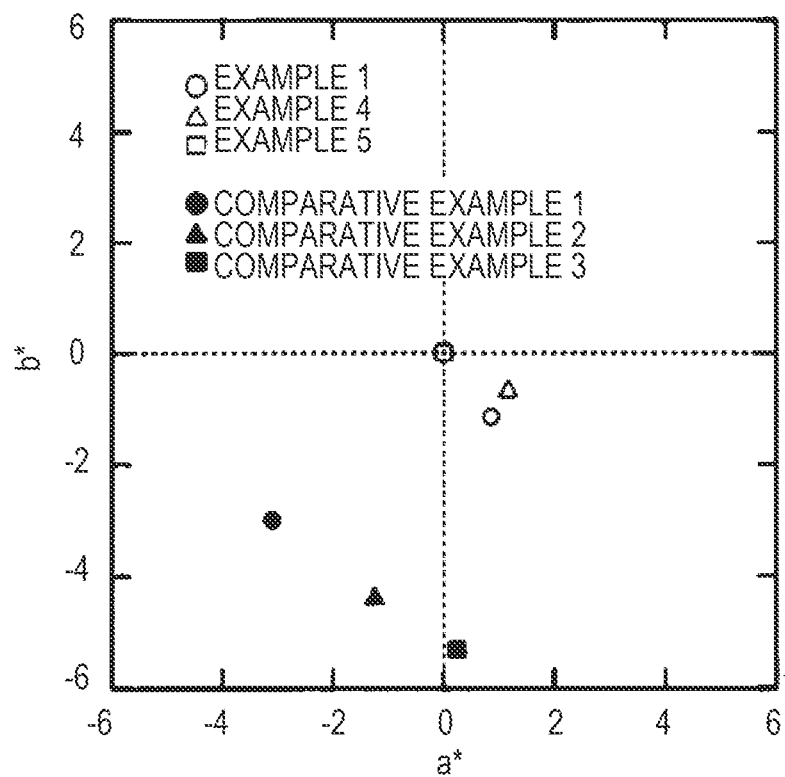
FIG. 13 is a diagram illustrating the evaluation result of the light source influence on the color reproducibility of the EC elements of Examples 4 and 5 and Comparative Example 2 and 3.

FIG. 13 illustrates the results of evaluating the light source influence on the color reproducibility of the EC elements of Examples 1, 4, and 5 and Comparative Examples 1, 2, and 3. From FIG. 13, in Examples 1, 4, and 5, the plot of the light attenuation state of the contrast light source is closer to the origin (transmission state) than in Comparative Examples 1, 2, and 3. From this, it can be seen that the EC elements of Examples 1, 4 and 5 in which $NWD_{Max}$ is prioritized are able to reduce the light source influence on color reproducibility as compared with the EC elements of Comparative Examples 1, 2 and 3 in which wavelength flatness is prioritized. Table 9 shows the values of the color difference ($\Delta E_{00}$) between the light attenuation state (plot) and the transmission state (origin) illustrated in FIG. 13.

TABLE 9

|  | Example 1 | Example 4 | Example 5 | Comparative Example 1 | Comparative Example 2 | Comparative Example 3 |
| --- | --- | --- | --- | --- | --- | --- |
| $NWD_{Max}$ | 1.0124 | 1.0071 | 1.0010 | 1.0387 | 1.0415 | 1.0521 |
| TF [%] | 103 | 140 | 136 | 67.6 | 84.3 | 77.1 |
| $\Delta E_{00}$ | 1.65 | 1.79 | 0.006 | 4.93 | 4.31 | 4.75 |

As shown in Table 12, even when the EC compounds are different, the light source influence on color reproducibility can be suppressed in the case where $NWD_{Max}$ is prioritized as in the present disclosure, as compared with the case where the wavelength flatness is prioritized. Specifically, it was found that the light source influence could be suppressed by about 2.4 times or more for all combinations of three kinds of compounds. In addition, functionality evaluation of a simulation image was performed when the EC element of the Example was installed as a variable ND filter in a camera having an imaging element and the light source was changed. It was recognized that the EC element of the Example had a small feeling of discomfort in both the reference light source and the contrast light source when compared with the images in the transmission state and the light attenuation state of the element. From this, it was found that good color reproducibility was obtained by setting the value of $NWD_{Max}$ to 1.03 or less as a value using the variable transmittance $VT(\lambda)$ normalized so that the average change amount was ND64.

Example 6

Figure 15:
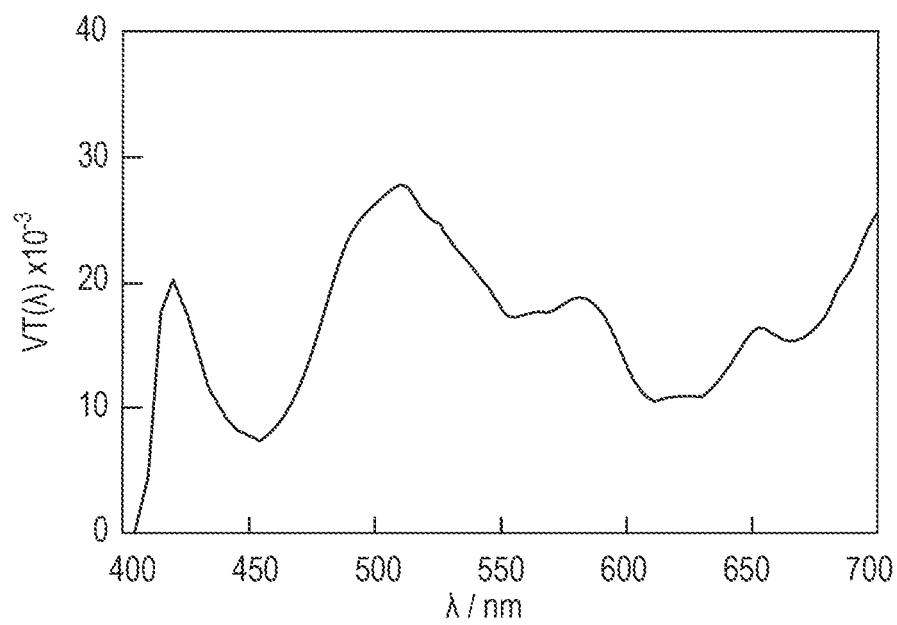
FIG. 15 illustrates a variable transmittance spectrum of the EC element of Example 6.

FIG. 15 illustrates $VT(\lambda)$ of the EC element of Example 6 in which the EC layer was formed in a different composition (concentration ratio) by using the same EC compound group as in Comparative Example 3. The wavelength flatness TF in the detection light wavelength region was 130%. The concentration of each EC compound in a light attenuation state (mmol/L unit) and the total charge concentration of each of the anode EC compound and the cathode EC compound are shown in Table 10.

TABLE 10

| | EC Compound | | | | | |
| --- | --- | --- | --- | --- | --- | --- |
| | (1) | (2) | (3) | (8) | (9) | (10) |
| Example 6 [mmol/L] | 13.3 | 17.6 Total: 60.2 | 29.3 | 21.7 | 32.1 Total: 60.2 | 6.4 |

From Table 10, it can be confirmed that the total charge concentration in the light attenuation state of the anode EC compound and the total charge concentration in the light attenuation state of the cathode EC compound of Example 6 are substantially equal to each other at 60.2 mmol/L and 60.2 mmol/L, respectively.

Table 11 shows values of $NWD_{Max}$ and wavelength flatness TF calculated using the daytime natural light spectrum illustrated in FIG. 3A as a reference light source and the neutral white light fluorescent lamp illustrated in FIG. 14 as a contrast light source. Table 11 also shows values of $NWD_{Max}$ and wavelength flatness of Comparative Example 3 (wavelength flatness priority) constituted by using the same compound group.

From Table 11, it was confirmed that the EC elements of Examples 1 to 3 can be handled by a fluorescent lamp having a spectrum with a large intensity change in a medium color temperature region than that of the EC element of Comparative Example 1.

Figure 16:
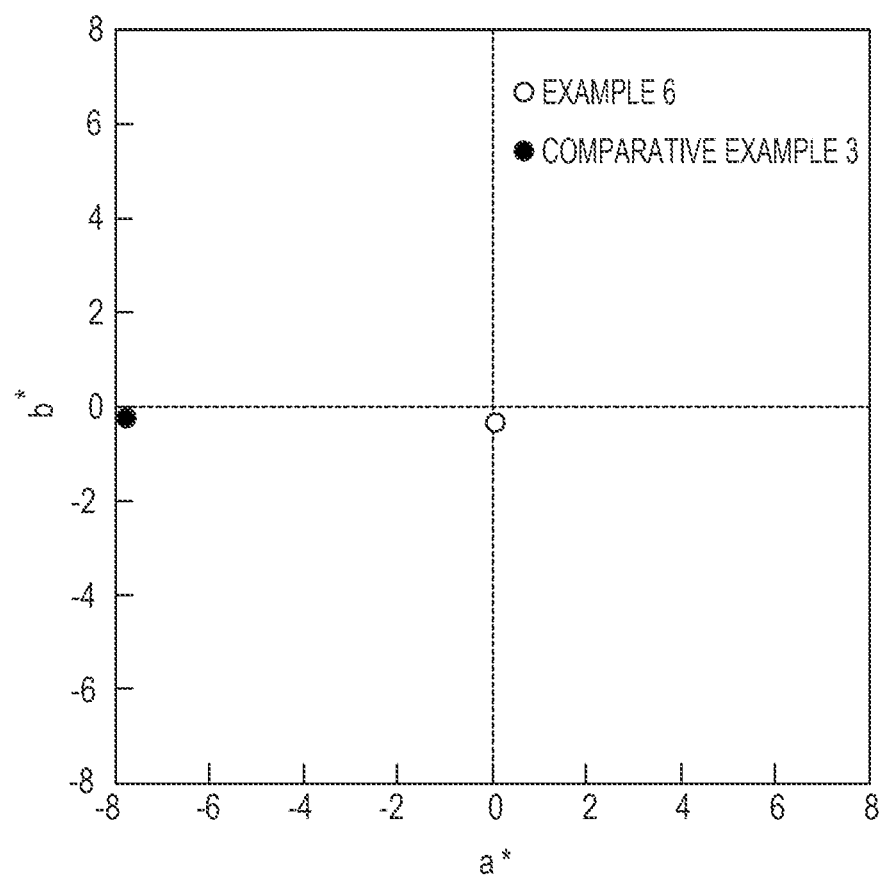
FIG. 16 is a diagram illustrating the evaluation result of the light source influence on the color reproducibility of the EC elements of Example 6 and Comparative Example 3.

FIG. 16 illustrates the results of evaluating the light source influences on color reproducibility in the case where the daytime natural light illustrated in FIG. 3A is used as the reference light source and the neutral white fluorescent lamp illustrated in FIG. 14 is used as the contrast light source in the EC elements of Example 6 and Comparative Example 3. From FIG. 16, in Example 6, the plot of the light attenuation state of the contrast light source is closer to the origin (transmission state) than in Comparative Example 3. From this, it can be seen that the EC element of Example 6, in which $NWD_{Max}$ is prioritized, can reduce the light source influence on color reproducibility as compared with the EC element of Comparative Example 3, in which wavelength flatness is prioritized. Table 11 shows the values of the color difference ($\Delta E_{00}$) between the light attenuation state (plot) and the transmission state (origin) illustrated in FIG. 16.

TABLE 11

|  | Example 6 | Comparative Example 3 |
| --- | --- | --- |
| $NWD_{Max}$ | 1.0048 | 1.0817 |
| TF [%] | 130 | 77.1 |
| $\Delta E_{00}$ | 0.35 | 9.25 |

From Table 11, it was found that even when the same EC compound was combined, the light source influence was able to be suppressed in the composition in which $NWD_{Max}$ was prioritized as in the present disclosure, as compared with the composition in which wavelength flatness was prioritized. Specifically, when a spectrum of daytime natural light having a relatively small intensity change is used as a reference light source, and a fluorescent lamp light source having a spectrum having a large intensity change is used as a contrast light source, the light source influence can be suppressed by about 26 times. In addition, functionality evaluation of a simulation image was performed when the EC element of the Example was installed as a variable ND filter in a camera having an imaging element and the light source was changed. It was recognized that the EC element of the Example had a small feeling of discomfort in both the reference light source and the contrast light source when compared with the images in the transmission state and the light attenuation state of the element. From this, it was found that good color reproducibility was obtained by setting the value of $NWD_{Max}$ to 1.03 or less as a value using the variable transmittance $VT(\lambda)$ normalized so that the average change amount was ND64.

According to the present disclosure, it is possible to provide a light modulating element such as a variable ND filter in which a substantial light source influence on color reproducibility is highly suppressed, and an optical apparatus, an imaging apparatus, and a lens unit using the light modulating element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An optical apparatus comprising:
   a photodetector; and
   a light modulating element comprising a plurality of compounds light absorption characteristics of which change with external simulation,
   wherein the plurality of compounds are compounds having different absorption wavelengths,
   wherein the light modulating element has a variable transmittance $VT(\lambda)$ obtained by combining light absorption characteristics of the plurality of compounds,
   wherein $NWD_{Max} < NWD_{MaxFP}$ is satisfied,
   where $NWD_{Max}$ is a maximum value of ratios between a reference light source and a contrast light source and ratios of a signal intensity ratio of a transmitted light for each detection light wavelength region incident on the photodetector between a transmission state and a light attenuation state of the light modulating element (the reference light source/the contrast light source or the contrast light source/the reference light source), and
   $NWD_{MaxFP}$ is $NWD_{Max}$ in a concentration ratio of the plurality of compounds in which wavelength flatness TF of the $VT(\lambda)$ in the detection light wavelength region is a minimum value $TF_{FP}$, and
   wherein the variable transmittance $VT(\lambda)$ is expressed by formula:

$$VT(\lambda) = 10^{-L \Sigma \Delta \varepsilon_m(\lambda) C_m}$$

where $\Delta \varepsilon m(\lambda)$ is an absorbance coefficient change of a compound m, where m is 1 to a total number of compounds,
   $C_m$ is a concentration of the compound m in the light attenuation state, and
   L is an optical path length [m] of the light modulating element.

2. The optical apparatus according to claim 1, wherein the $NWD_{Max}$ is a maximum value of $NW_{R1}/NW_{R0}$, $NW_{R0}/NW_{R1}$, $NW_{B1}/NW_{B0}$, and $NW_{B0}/NW_{B1}$,
   where $NW_{R0}$ is a detection signal ratio change in the photodetector in a red wavelength region of a transmitted light emitted from the reference light source and transmitted through the light modulating element,
   $NW_{R1}$ is a detection signal ratio change in the photodetector in a red wavelength region of a transmitted light emitted from the contrast light source and transmitted through the light modulating element,
   $NW_{B0}$ is a detection signal ratio change in the photodetector in a blue wavelength region of the transmitted light emitted from the reference light source and transmitted through the light modulating element,
   $NW_{B1}$ is a detection signal ratio change in the photodetector in the blue wavelength region of the transmitted light emitted from the contrast light source and transmitted through the light modulating element,
   $NW_{R0} = W_{RC0}/W_{RT0}$,
   $NW_{R1} = W_{RC1}/W_{RT1}$,
   $NW_{B0} = W_{BC0}/W_{BT0}$,
   $NW_{B1} = W_{BC1}/W_{BT1}$,
   $W_{RC0} = S_{GC0}/S_{RC0}$,
   $W_{RC1} = S_{GC1}/S_{RC1}$,
   $W_{RT0} = S_{GT0}/S_{RT0}$,
   $W_{RT1} = S_{GT1}/S_{RT1}$,
   $W_{BC0} = S_{GC0}/S_{BC0}$,
   $W_{BC1} = S_{GC1}/S_{BC1}$,
   $W_{BT0} = S_{GT0}/S_{BT0}$,
   $W_{BT1} = S_{GT1}/S_{BT1}$,
   $S_{RT0}$ and $S_{RT1}$ are detection signal intensities in the photodetector in the red wavelength region of the transmitted light emitted from the reference light source and the contrast light source respectively and transmitted through the light modulating element in the transmission state,
   $S_{GT0}$ and $S_{GT1}$ are detection signal intensities in the photodetector in a green wavelength region of the transmitted light emitted from the reference light source and the contrast light source respectively and transmitted through the light modulating element in the transmission state,
   $S_{BT0}$ and $S_{BT1}$ are detection signal intensities in the photodetector in the blue wavelength region of the transmitted light emitted from the reference light source and the contrast light source respectively and transmitted through the light modulating element in the transmission state,
   $S_{RC0}$, and $S_{RC1}$ are detection signal intensities in the photodetector in the red wavelength region of the transmitted light emitted from the reference light source and the contrast light source respectively and transmitted through the light modulating element in the light attenuation state,
   $S_{GC0}$ and $S_{GC1}$ are detection signal intensities in the photodetector in the green wavelength region of the transmitted light emitted from the reference light source and the contrast light source respectively and transmitted through the light modulating element in the light attenuation state, and
   $S_{BC0}$ and $S_{BC1}$ are detection signal intensities in the photodetector in the blue wavelength region of the transmitted light emitted from the reference light source and the contrast light source respectively and transmitted through the light modulating element in the light attenuation state.

3. The optical apparatus according to claim 1, wherein the $NWD_{Max}$ is equal to or less than 1.03 using the variable transmittance $VT(\lambda)$ normalized so that a change amount becomes 1/64.

4. The optical apparatus according to claim 1, wherein the plurality of compounds are compounds in which light absorption characteristics change electrically.

5. The optical apparatus according to claim 1, wherein the plurality of compounds are electrochromic compounds.

6. The optical apparatus according to claim 1, wherein the plurality of compounds are three or more compounds.

7. The optical apparatus according to claim 1, wherein the plurality of compounds is an anode electrochromic compound and a cathode electrochromic compound, and
wherein a sum of charge concentrations of the anode electrochromic compound in the light attenuation state and a sum of charge concentrations of the cathode electrochromic compound in the light attenuation state are substantially equal to each other.

8. The optical apparatus according to claim 7, containing a plurality of anode electrochromic compounds and cathode electrochromic compounds, respectively.

9. The optical apparatus according to claim 1, wherein at least one of the compounds selected from the plurality of compounds in each one of the plurality of detection light wavelength regions of the photodetector has a peak in a variable absorption spectrum.

10. The optical apparatus according to claim 1, wherein the reference light source has a color temperature of 4000K to 7000K.

11. The optical apparatus according to claim 10, wherein the reference light source is daytime sunlight.

12. The optical apparatus according to claim 10, wherein the contrast light source is selected from a pseudo-sunlight source, D50, D55, D65, a B light source, and a C light source.

13. The optical apparatus according to claim 1, wherein the contrast light source has a color temperature of 2000K to 4000K or 7000K to 9000K.

14. The optical apparatus according to claim 13, wherein the contrast light source is selected from a halogen lamp, an incandescent lamp and an A light source.

15. The optical apparatus according to claim 1, wherein both the reference light source and the contrast light source have a color temperature region selected from three color temperature regions of 2000K to 4000K, 4000K to 7000K and 7000K to 9000K, and
wherein the contrast light source is either a fluorescent lamp or an LED light source.

16. The optical apparatus according to claim 1, wherein the photodetector is an imaging element.

17. The optical apparatus according to claim 1, wherein a light attenuation ratio, which is a ratio of the transmission state to the light attenuation state, is 8 or more.

18. The optical apparatus according to claim 17, wherein the light attenuation ratio is 32 or more.

19. The optical apparatus according to claim 1, wherein $TF > TF_{FP}$ is satisfied.

20. An optical apparatus comprising:
a light modulating element; and
a photodetector that receives a light passing through the light modulating element and has a plurality of detection light wavelength regions directed to the light modulating element,
wherein the photodetector is an imaging element,
wherein the light modulating element comprises a plurality of compounds light absorption characteristics of which change with external simulation,
wherein the plurality of compounds are compounds having different absorption wavelengths,
wherein the light modulating element has a variable transmittance $VT(\lambda)$ obtained by combining light absorption characteristics of the plurality of compounds,
wherein $NWD_{Max} < NWD_{MaxFP}$ is satisfied,
where $NWD_{Max}$ is a maximum value of ratios between a reference light source and a contrast light source and ratios of a signal intensity ratio of a transmitted light for each detection light wavelength region incident on the photodetector between a transmission state and a light attenuation state of the light modulating element (the reference light source/the contrast light source or the contrast light source/the reference light source), and
$NWD_{MaxFP}$ is $NWD_{Max}$ in a concentration ratio of the plurality of compounds in which wavelength flatness TF of the $VT(\lambda)$ in the detection light wavelength region is a minimum value $TF_{FP}$, and
wherein the variable transmittance $VT(\lambda)$ is expressed by formula:

$$VT(\lambda) = 10^{-L\Sigma\Delta\varepsilon_m(\lambda)C_m}$$

where $\Delta\varepsilon m(\lambda)$ is an absorbance coefficient change of a compound m, where m is 1 to a total number of compounds,
$C_m$ is a concentration of the compound m in the light attenuation state, and
L is an optical path length [m] of the light modulating element.

21. An imaging apparatus comprising:
an optical system including a plurality of lenses;
an imaging element that receives a light passing through the optical system; and
an optical filter arranged between the optical system and the imaging element,
wherein the optical filter includes a light modulating element comprising a plurality of compounds light absorption characteristics of which change with external simulation,
wherein the plurality of compounds are compounds having different absorption wavelengths,
wherein the light modulating element has a variable transmittance $VT(\lambda)$ obtained by combining light absorption characteristics of the plurality of compounds, wherein $NWD_{Max} < NWD_{MaxFP}$ is satisfied,
where $NWD_{Max}$ is a maximum value of ratios between a reference light source and a contrast light source and ratios of a signal intensity ratio of a transmitted light for each detection light wavelength region incident on a photodetector between a transmission state and a light attenuation state of the light modulating element (the reference light source/the contrast light source or the contrast light source/the reference light source), and
$NWD_{MaxFP}$ is $NWD_{Max}$ in a concentration ratio of the plurality of compounds in which wavelength flatness TF of the $VT(\lambda)$ in the detection light wavelength region is a minimum value $TF_{FP}$, and
wherein the variable transmittance $VT(\lambda)$ is expressed by formula:

$$VT(\lambda) = 10^{-L\Sigma\Delta\varepsilon_m(\lambda)C_m}$$

where $\Delta\varepsilon m(\lambda)$ is an absorbance coefficient change of a compound m, where m is 1 to a total number of compounds,
$C_m$ is a concentration of the compound m in the light attenuation state, and
L is an optical path length [m] of the light modulating element.

22. A lens unit comprising:
a light modulating element; and
an imaging optical system including a plurality of lenses,
wherein the lens unit is connectable to an optical apparatus including a photodetector, wherein the lens unit is connected to an optical apparatus having a photodetector so that light passing through the lens unit is incident on the photodetector of the optical apparatus, wherein the photodetector is a photodetector having a plurality of detection light wavelength regions directed to the light modulating element, and wherein the light modulating element comprises a plurality of compounds light absorption characteristics of which change with external simulation, wherein the plurality of compounds are compounds having different absorption wavelengths, wherein the light modulating element has a variable transmittance $VT(\lambda)$ obtained by combining light absorption characteristics of the plurality of compounds, wherein $NWD_{Max} < NWD_{MaxFP}$ is satisfied, where $NWD_{Max}$ is a maximum value of ratios between a reference light source and a contrast light source and ratios of a signal intensity ratio of a transmitted light for each detection light wavelength region incident on the photodetector between a transmission state and a light attenuation state of the light modulating element (the reference light source/the contrast light source or the contrast light source/the reference light source), and $NWD_{MaxFP}$ is $NWD_{Max}$ in a concentration ratio of the plurality of compounds in which wavelength flatness TF of the $VT(\lambda)$ in the detection light wavelength region is a minimum value $TF_{FP}$, and wherein the variable transmittance $VT(\lambda)$ is expressed by formula:

$$VT(\lambda) = 10^{-L\Sigma\Delta\varepsilon_m(\lambda)C_m}$$

where $\Delta\varepsilon_m(\lambda)$ is an absorbance coefficient change of a compound m, where m is 1 to a total number of compounds, $C_m$ is a concentration of the compound m in the light attenuation state, and L is an optical path length [m] of the light modulating element.

23. The lens unit according to claim 22, wherein the photodetector is an imaging element.

24. An optical apparatus comprising:

a photodetector; and a light modulating element comprising a plurality of compounds light absorption characteristics of which change with external simulation, wherein the plurality of compounds are compounds having different absorption wavelengths, wherein the light modulating element has a variable transmittance $VT(\lambda)$ obtained by combining light absorption characteristics of the plurality of compounds, wherein $NWD_{Max} < NWD_{MaxFP}$ is satisfied, where $NWD_{Max}$ is a maximum value of ratios between a reference light source and a contrast light source and ratios of a signal intensity ratio of a transmitted light for each detection light wavelength region incident on the photodetector between a transmission state and a light attenuation state of the light modulating element (the reference light source/the contrast light source or the contrast light source/the reference light source), and $NWD_{MaxFP}$ is $NWD_{Max}$ in a concentration ratio of the plurality of compounds in which wavelength flatness TF of the $VT(\lambda)$ in the detection light wavelength region is a minimum value $TF_{FP}$, and wherein the $NWD_{Max}$ is a maximum value of $NW_{R1}/NW_{R0}$, $NW_{R0}/NW_{R1}$, $NW_{B1}/NW_{B0}$, and $NW_{B0}/NW_{B1}$, where $NW_{R0}$ is a detection signal ratio change in the photodetector in a red wavelength region of a transmitted light emitted from the reference light source and transmitted through the light modulating element, $NW_{R1}$ is a detection signal ratio change in the photodetector in a red wavelength region of a transmitted light emitted from the contrast light source and transmitted through the light modulating element, $NW_{B0}$ is a detection signal ratio change in the photodetector in a blue wavelength region of the transmitted light emitted from the reference light source and transmitted through the light modulating element, $NW_{B1}$ is a detection signal ratio change in the photodetector in the blue wavelength region of the transmitted light emitted from the contrast light source and transmitted through the light modulating element, $NW_{R0} = W_{RC0}/W_{RT0}$,
$NW_{R1} = W_{RC1}/W_{RT1}$,
$NW_{B0} = W_{BC0}/W_{BT0}$,
$NW_{B1} = W_{BC1}/W_{BT1}$,
$W_{RC0} = S_{GC0}/S_{RC0}$,
$W_{RC1} = S_{GC1}/S_{RC1}$,
$W_{RT0} = S_{GT0}/S_{RT0}$,
$W_{RT1} = S_{GT1}/S_{RT1}$,
$W_{BC0} = S_{GC0}/S_{BC0}$,
$W_{BC1} = S_{GC1}/S_{BC1}$,
$W_{BT0} = S_{GT0}/S_{BT0}$,
$W_{BT1} = S_{GT1}/S_{BT1}$, $S_{RT0}$ and $S_{RT1}$ are detection signal intensities in the photodetector in the red wavelength region of the transmitted light emitted from the reference light source and the contrast light source respectively and transmitted through the light modulating element in the transmission state, $S_{GT0}$ and $S_{GT1}$ are detection signal intensities in the photodetector in a green wavelength region of the transmitted light emitted from the reference light source and the contrast light source respectively and transmitted through the light modulating element in the transmission state, $S_{BT0}$ and $S_{BT1}$ are detection signal intensities in the photodetector in the blue wavelength region of the transmitted light emitted from the reference light source and the contrast light source respectively and transmitted through the light modulating element in the transmission state, $S_{RC0}$, and $S_{RC1}$ are detection signal intensities in the photodetector in the red wavelength region of the transmitted light emitted from the reference light source and the contrast light source respectively and transmitted through the light modulating element in the light attenuation state, $S_{GC0}$ and $S_{GC1}$ are detection signal intensities in the photodetector in the green wavelength region of the transmitted light emitted from the reference light source and the contrast light source respectively and transmitted through the light modulating element in the light attenuation state, and $S_{BC0}$ and $S_{BC1}$ are detection signal intensities in the photodetector in the blue wavelength region of the transmitted light emitted from the reference light source and the contrast light source respectively and transmitted through the light modulating element in the light attenuation state.

25. An optical apparatus comprising:
a photodetector; and
a light modulating element comprising a plurality of compounds light absorption characteristics of which change with external simulation,
wherein the plurality of compounds are compounds having different absorption wavelengths,
wherein the light modulating element has a variable transmittance $VT(\lambda)$ obtained by combining light absorption characteristics of the plurality of compounds,
wherein $NWD_{Max} < NWD_{MaxFP}$ is satisfied,
where $NWD_{Max}$ is a maximum value of ratios between a reference light source and a contrast light source and ratios of a signal intensity ratio of a transmitted light for each detection light wavelength region incident on the photodetector between a transmission state and a light attenuation state of the light modulating element (the reference light source/the contrast light source or the contrast light source/the reference light source), and
$NWD_{MaxFP}$ is $NWD_{Max}$ in a concentration ratio of the plurality of compounds in which wavelength flatness TF of the $VT(\lambda)$ in the detection light wavelength region is a minimum value $TF_{FP}$, and
wherein the $NWD_{Max}$ is equal to or less than 1.03 using the variable transmittance $VT(\lambda)$ normalized so that a change amount becomes 1/64.

26. The optical apparatus according to claim 24, wherein $TF > TF_{FP}$ is satisfied.

27. The optical apparatus according to claim 25, wherein $TF > TF_{FP}$ is satisfied.

* * * * *